United States Patent
Dong et al.

(10) Patent No.: US 9,749,633 B2
(45) Date of Patent: Aug. 29, 2017

(54) SYSTEM AND METHOD OF VIDEO CODING QUANTIZATION AND DYNAMIC RANGE CONTROL

(71) Applicant: VID Scale, Inc., Wilmington, DE (US)

(72) Inventors: Jie Dong, San Diego, CA (US); Yan Ye, San Diego, CA (US)

(73) Assignee: VID SCALE, INC., Wilmington, DE (US)

( * ) Notice: Subject to any disclaimer, the term of this patent is extended or adjusted under 35 U.S.C. 154(b) by 263 days.

(21) Appl. No.: 14/372,172

(22) PCT Filed: Jan. 11, 2013

(86) PCT No.: PCT/US2013/021218
§ 371 (c)(1),
(2) Date: Jul. 14, 2014

(87) PCT Pub. No.: WO2013/109471
PCT Pub. Date: Jul. 25, 2013

(65) Prior Publication Data
US 2015/0172661 A1    Jun. 18, 2015

Related U.S. Application Data

(60) Provisional application No. 61/588,649, filed on Jan. 19, 2012.

(51) Int. Cl.
*H04N 19/13* (2014.01)
*H04N 19/126* (2014.01)
(Continued)

(52) U.S. Cl.
CPC ........... *H04N 19/126* (2014.11); *H04N 19/13* (2014.11); *H04N 19/176* (2014.11); *H04N 19/45* (2014.11);
(Continued)

(58) Field of Classification Search
CPC .... H04N 19/126; H04N 19/13; H04N 19/176; H04N 19/45; H04N 19/51; H04N 19/593; H04N 19/60; H04N 19/61; H04N 19/625
(Continued)

(56) References Cited

U.S. PATENT DOCUMENTS

| | | | |
|---|---|---|---|
| 2003/0081674 A1 | 5/2003 | Malvar et al. | |
| 2003/0152280 A1* | 8/2003 | Kadowaki | H04N 19/176 382/240 |

(Continued)

FOREIGN PATENT DOCUMENTS

| | | |
|---|---|---|
| JP | 2007-128504 | 5/2007 |

OTHER PUBLICATIONS

Ben-Israel et al, A Multi-Transform search Algorithms to Enhance H.264/AVC Performance, 2006.*
(Continued)

*Primary Examiner* — Shan Elahi
(74) *Attorney, Agent, or Firm* — Youngae Kim

(57) ABSTRACT

Methods, apparatus and systems for processing video blocks. The method including transforming, via a transform unit, the video residual data using a single one-dimensional transform to generate a first set of coefficients associated with the video block; quantizing, via a quantization unit, the first set of coefficients to generate a second set of quantized coefficients, wherein the method for processing the video residual data includes bit-shifting any of the first and second sets of coefficients; entropy coding the second set of quantized coefficients after the bit-shifting; and transmitting the entropy coded second set of quantized coefficients. In certain embodiments, the bit shifting may include integer and/or fractional bit shifting.

19 Claims, 17 Drawing Sheets
(4 of 17 Drawing Sheet(s) Filed in Color)

(51) Int. Cl.

| | | |
|---|---|---|
| *H04N 19/51* | (2014.01) | |
| *H04N 19/61* | (2014.01) | |
| *H04N 19/593* | (2014.01) | |
| *H04N 19/44* | (2014.01) | |
| *H04N 19/625* | (2014.01) | |
| *H04N 19/176* | (2014.01) | |
| *H04N 19/60* | (2014.01) | |

(52) U.S. Cl.
CPC ........... *H04N 19/51* (2014.11); *H04N 19/593* (2014.11); *H04N 19/60* (2014.11); *H04N 19/61* (2014.11); *H04N 19/625* (2014.11)

(58) Field of Classification Search
USPC .................................................. 375/240.03
See application file for complete search history.

(56) References Cited

U.S. PATENT DOCUMENTS

| | | | | |
|---|---|---|---|---|
| 2003/0206582 A1* | 11/2003 | Srinivasan | ............ | G06F 17/147 375/240.01 |
| 2003/0227969 A1* | 12/2003 | Wise | .................... | G06F 9/3867 375/240.1 |
| 2005/0053150 A1* | 3/2005 | Hsu | ...................... | H04N 19/102 375/240.18 |
| 2006/0002479 A1* | 1/2006 | Fernandes | .............. | H04N 19/61 375/240.25 |
| 2006/0120450 A1* | 6/2006 | Han | ..................... | H04N 19/176 375/240.03 |
| 2006/0126955 A1* | 6/2006 | Srinivasan | ........... | H04N 19/136 382/239 |
| 2007/0016405 A1* | 1/2007 | Mehrotra | .............. | G10L 19/025 704/203 |
| 2007/0274383 A1* | 11/2007 | Yu | ........................... | G10L 19/24 375/240.11 |
| 2007/0296613 A1* | 12/2007 | Hussain | ................. | H04N 19/61 341/50 |
| 2008/0089422 A1* | 4/2008 | Karczewicz | ......... | H04N 19/176 375/240.23 |
| 2009/0097545 A1* | 4/2009 | Ugur | .................... | H04N 19/176 375/240.02 |
| 2009/0097547 A1* | 4/2009 | Ugur | ...................... | H04N 19/82 375/240.02 |
| 2011/0280302 A1* | 11/2011 | Alshina | .................. | H04N 19/42 375/240.03 |
| 2012/0177108 A1* | 7/2012 | Joshi | ..................... | G06F 17/147 375/240.03 |
| 2013/0022125 A1* | 1/2013 | Sato | ....................... | H04N 19/52 375/240.16 |
| 2013/0028530 A1* | 1/2013 | Drugeon | .............. | H04N 19/136 382/233 |
| 2013/0114732 A1* | 5/2013 | Dong | .................... | G06F 17/147 375/240.19 |
| 2014/0056362 A1* | 2/2014 | Mrak | ................... | H04N 19/176 375/240.18 |

OTHER PUBLICATIONS

Hlll et al, Interpolation free sub-pixel motion estimation for H.264, 2006.*
Sheng et al, An implemented architecture of deblocking filter for H.264/AVC, 2004.*
"Advanced video coding for generic audiovisual services", ITU-T Recommendation H.264, Nov. 2007, 564 pages.
"Notification of Transmittal of the International Search Report and the Written Opinion of the International Search Authority, or the Declaration", PCT/US2013/021218, Apr. 22, 2013, 17 pages.
"VC-1 Compressed Video Bitstream Format and Decoding Process—Amendment 2", SMPTE Amendment 2:2011 SMPTE 421M-2006, Society of Motion Picture and Television Engineers, Feb. 2011, 5 Pages.
Bross, B., et al., "WD5: Working Draft 5 of High-Efficiency Video Coding", Joint Collaborative Team on Video Coding (JCT-VC) of ITU-T SG16 WP3 and ISO/IEC JTC1/SC29/WG11; Document No. JCTVC-G1103, Nov. 2011, 238 pages.
Dong, Jie, et al., "Non-CE5: Improved Transform Skipping Mode", Joint Collaborative Team on Video Coding (JCT-VC) of ITU-T SG16 WP3 and ISO/IEC JTC1/SC29/WG11; Document No. JCTVC-H0141, 8TH Meeting San Jose CA USA, Feb. 1-10, 2012, 4 pages.
Fuldseth, A., et al., "Transform Design for HEVC with 16 Bit Intermediate Data Representation", Joint Collaborative Team on Video Coding (JCT-VC) of ITU-T SG16 WP3 and ISO/IEC JTC1/SC29/WG11; Document No. JVT VC-E243; 5th Meeting, Geneva CH, Mar. 16-23, 2011, 12 pages.
Jayant, N.S., et al., "Chapter 12.4 Optimum Bit Allocation and Zonal Sampling", Digital Coding of Waveforms: Principles and Applications to Speech and Video; Englewood Cliffs, NJ: Prentice-Hall, 1984, 6 pages.
McCann, Ken, et al., "HM5: High Efficiency Video Coding (HEVC) Test Model 5 Encoder Description", Joint Collaborative Team on Video Coding (JCT-VC) of ITU-T SG16 WP3 and ISO/IEC JTC1/SC29/WG11; Document No. JCTVC-G1102, Nov. 2011, 45 pages.
Mrak, Marta, et al., "Transform Skip Mode", Joint Collaborative Team on Video Coding (JCT-VC) of ITU-T SG16 WP3 and ISO/IEC JTC1/SC29/WG11; Document No. JCTVC-G575, 7th Meeting, Geneva CH, Nov. 21-30, 2011, 13 pages.
Mrak, Marta, et al., "Transform Skip Mode", Joint Collaborative Team on Video Coding (JCT-VC) of ITU-T SG16 WP3 and ISO/IEC JTC1/SC29/WG11; Document No. JCTVC-F077, 6th Meeting, Torino IT, Ju. 14-22, 2011, 6 pages.
Sullivan, G.J., et al., "Rate-Distortion Optimization for Video Compression", IEEE Signal Processing Magazine; vol. 15, issue 6, Nov. 1998, 17 pages.
Tourapis, Alexis M., et al., "H.264/14496-10 AVC Reference Software Manual", Joint Video Team (JVT) of ISO/IEC MPEG & ITU-T VCEG (ISO/IEC JTC1/SC29/WG11 and ITU-T SG16 Q.6) 31st Meeting: London, UK, Jun. 28-Jul. 3, 2009; Document No. JVT-AE010; Filename: JVT-AE010.doc, 90 Pages.
"Japanese Notice of Rejection", Japanese Application No. 2014-553330, Dec. 27, 2016, 5 pages.
"Japanese Notice of Rejection (English Translation)", Japanese Application No. 2014-553330, Dec. 27, 2016, 6 pages.

* cited by examiner

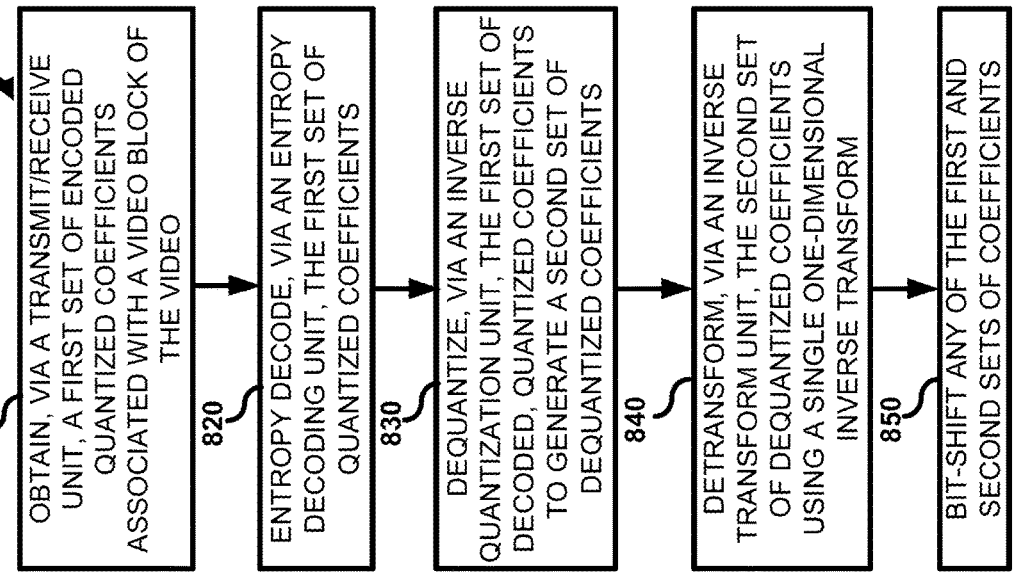
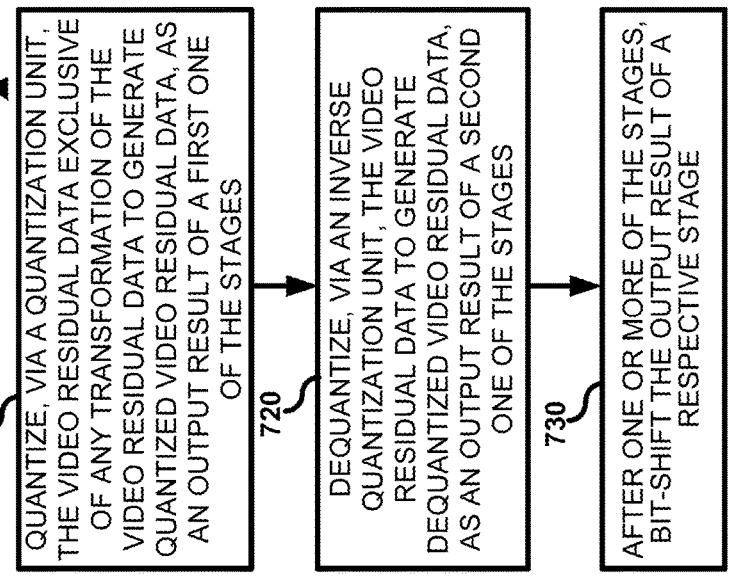

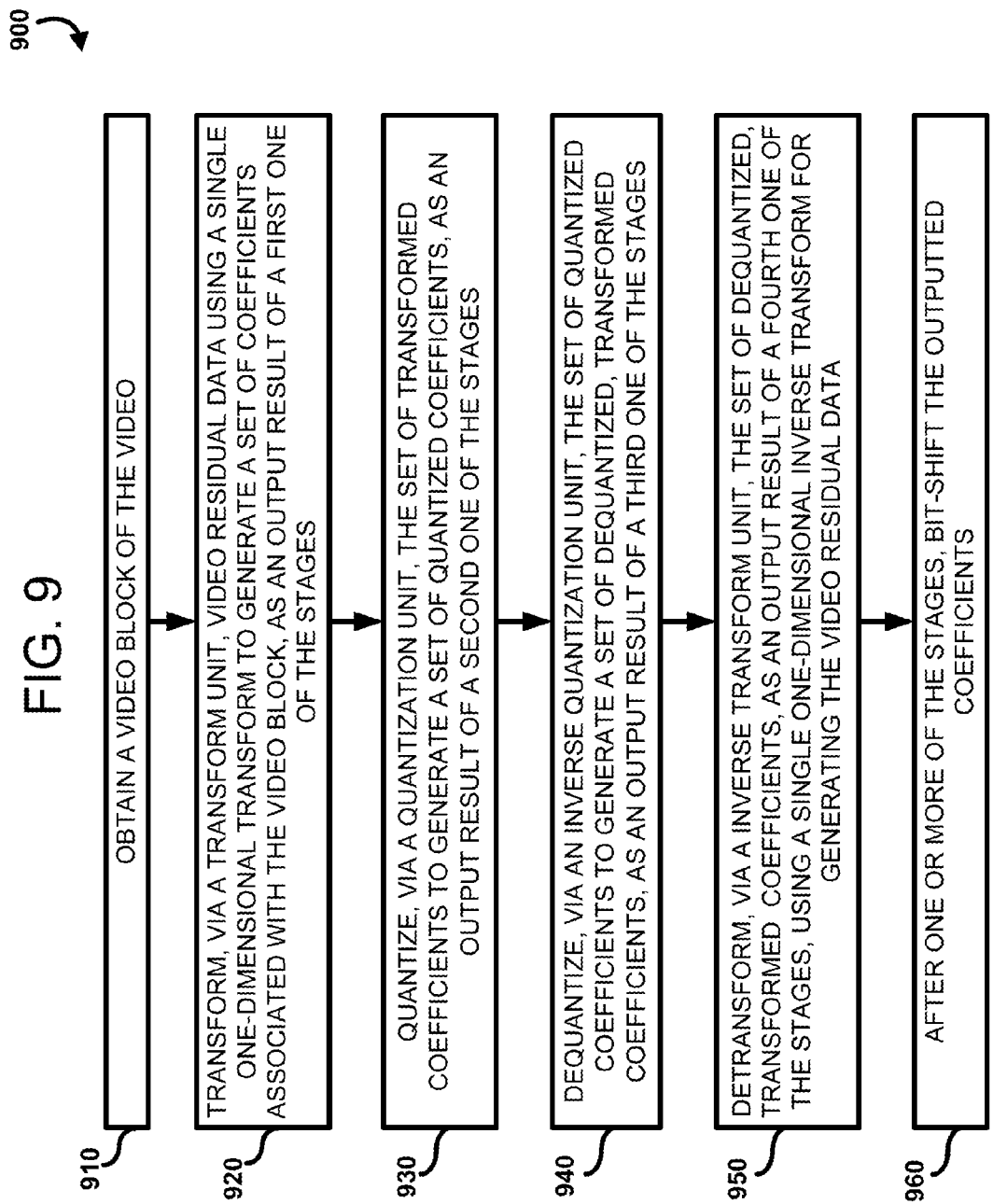

| Stage | Operations | Output DR of Each Stage | Bits of Right Shift |
|---|---|---|---|
| 0 | Input | 9+$\Delta BD$ | |
| 1 | Horizontal transform | (17/18/19/20)+$\Delta BD$ | (1/2/3/4)+$\Delta BD$ |
| | Right shift | 16 | |
| 2 | Vertical transform | (24/25/26/27) | (8/9/10/11) |
| | Right shift | 16 | |
| 3 | Quantization ($\times S_{M \times N}(i,j)$) | 30 | (19/18/17/16)-$\Delta BD$ |
| | Right shift | (11/12/13/14)+$\Delta BD$ | |
| 4 | Inverse Quantization ($\times IS_{M \times N}(i,j)$) | (17/18/19/20)+$\Delta BD$ | (1/2/3/4)+$\Delta BD$ |
| | Right shift | 16 | |
| 5 | Vertical inv. transform | 22 | 7 |
| | Right shift | 15 | |
| 6 | Horizontal inv. transform | 21 | 12-$\Delta BD$ |
| | Right shift | 9+$\Delta BD$ | |

FIG. 12

| Stage | Operations | Output DR of Each Stage | Bits of Right Shift |
|---|---|---|---|
| 0 | Input | 9+$\Delta BD$ | |
| 1 | Horizontal transform | (17/18/19/20)+$\Delta BD$ | (1/2/3/4)+$\Delta BD$ |
| | Right shift | 16 | |
| 2 | Quantization ($\times S_{M \times N}(i,j)$) | 30 | (20/19.5/19/18.5)-$\Delta BD$ |
| | Right shift | (10/10.5/11/11.5)+$\Delta BD$ | |
| 3 | Inverse Quantization ($\times IS_{M \times N}(i,j)$) | (16/16.5/17/17.5)+$\Delta BD$ | (1/1.5/2/2.5)+$\Delta BD$ |
| | Right shift | 15 | |
| 4 | Horizontal inv. transform | 21 | 12-$\Delta BD$ |
| | Right shift | 9+$\Delta BD$ | |

FIG. 13

| Stage | Operations | Output DR of Each Stage | Bits of Right Shift |
|---|---|---|---|
| 0 | Input | 9+ΔBD | |
| 1 | Vertical transform | (17/18/19/20)+ΔBD | (8/9/10/11) |
| | Right shift | 9+ΔBD | |
| 2 | Quantization (× $S_{M \times N}(i,j)$) | 23+ΔBD | |
| | Right shift | (10/10.5/11/11.5)+ΔBD | (13/12.5/12/11.5)-ΔBD |
| 3 | Inverse Quantization (× $IS_{M \times N}(i,j)$) | (16/16.5/17/17.5)+ΔBD | (6/6.5/7/7.5) |
| | Right shift | 10+ΔBD | |
| 4 | Vertical Inv. Transform | 16+ΔBD | 7 |
| | Right shift | 9+ΔBD | |

FIG. 14

| Stage | Operations | Output DR of Each Stage | Bits of Right Shift |
|---|---|---|---|
| 0 | Input | 9+ΔBD | |
| 1 | Quantization (× $S_{M \times N}(i,j)$) | 23+ΔBD | |
| | Right shift | 9+ΔBD | 14 |
| 2 | Inverse Quantization (× $IS_{M \times N}(i,j)$) | 15+ΔBD | |
| | Right shift | 9+ΔBD | 6 |

| | Horizontal & Vertical (H&V) | Horizontal Only (HO) | Vertical Only (VO) | Both Skipped (BS) |
|---|---|---|---|---|
| $Q_{M \times N}(i,j)$ | (19/18/17/16)-$\Delta BD$ | (20/19.5/19/18.5)-$\Delta BD$ | (13/12.5/12/11.5)-$\Delta BD$ | 14 |
| $IQ_{M \times N}(i,j)$ | (1/2/3/4)+$\Delta BD$ | (1/1.5/2/2.5)+$\Delta BD$ | (6/6.5/7/7.5) | 6 |

FIG. 17

| Stage | Operations | Output DR of Each Stage | Bits of Right Shift |
|---|---|---|---|
| 0 | Input | 9+$\Delta BD$ | |
| 1 | Horizontal transform | (17/18/19/20)+$\Delta BD$ | (1/2/3/4)+$\Delta BD$ |
| | Right shift | 16 | |
| 2 | Quantization (x $S_{M \times N}(i,j)$) | 30 | (20/19.5/19/18.5)-$\Delta BD$ |
| | Right shift | (10/10.5/11/11.5)+$\Delta BD$ | |
| 3 | Inverse Quantization (x $IS_{M \times N}(i,j)$) | (16/16.5/17/17.5)+$\Delta BD$ | (0/0.5/1/1.5)+$\Delta BD$ |
| | Right shift | 16 | |
| 4 | Horizontal inv. transform | 22 | 13-$\Delta BD$ |
| | Right shift | 9+$\Delta BD$ | |

| QP%6 | 0 | 1 | 2 | 3 | 4 | 5 |
|---|---|---|---|---|---|---|
| S | 18396 | 16384 | 14564 | 26214 | 23302 | 20560 |
| IS | 57 | 64 | 72 | 40 | 45 | 51 |

FIG. 18

| QP%6 | 0 | 1 | 2 | 3 | 4 | 5 |
|---|---|---|---|---|---|---|
| Q | X | X | X | X+1 | X+1 | X+1 |
| IQ | X+1 | X+1 | X+1 | X | X | X |

FIG. 19

SYSTEM AND METHOD OF VIDEO CODING QUANTIZATION AND DYNAMIC RANGE CONTROL

CROSS REFERENCE TO RELATED APPLICATIONS

This application claims priority from U.S. Provisional Application No. 61/588,649, filed Jan. 19, 2012, the contents of which are incorporated herein by reference.

FIELD OF DISCLOSURE

This application relates to video coding and, in particular, systems, apparatus, and methods of video coding quantization and dynamic range control.

BACKGROUND

Video coding systems are widely used to compress digital video signals to reduce the storage need and/or transmission bandwidth of such signals. Among the various types of video coding systems, such as block-based, wavelet-based, and object-based systems, nowadays block-based hybrid video coding systems are the most widely used and deployed. Examples of block-based video coding systems include international video coding standards such as the MPEG1/2/4 part 2, H.264/MPEG-4 part 10 AVC and VC-1 standards.

SUMMARY

Embodiments of the disclosure are directed to methods, apparatus, and systems for processing video residual data associated with a video block. One representative method includes transforming, via a transform unit, the video residual data using a single one-dimensional transform to generate a first set of coefficients associated with the video block and quantizing, via a quantization unit, the first set of coefficients to generate a second set of quantized coefficients, wherein the method for processing the video residual data includes bit-shifting any of the first and second sets of coefficients. The representative method also includes entropy coding the second set of quantized coefficients after the bit shifting and transmitting the entropy coded second set of quantized coefficients.

Another representative method includes obtaining, via a transmit/receive unit, a first set of encoded quantized coefficients associated with a video block of the video and entropy decoding, via an entropy decoding unit, the first set of quantized coefficients. The other representative method also includes dequantizing, via an inverse quantization unit, the first set of decoded, quantized coefficients to generate a second set of dequantized coefficients, detransforming, via an inverse transform unit, the second set of dequantized coefficients using a single one-dimensional inverse transform to generate the reconstructed video block and bit-shifting any of the first and second sets of coefficients.

A further representative method for processing video residual data associated with a video block in stages includes quantizing, via a quantization unit, the video residual data exclusive of any transformation of the video residual data to generate a quantized video residual data, as an output result of a first one of the stages and dequantizing, via an inverse quantization unit, the video residual data to generate dequantized video residual data, as an output result of a second one of the stages. After one or more of the stages, the output result of a respective stage is bit-shifted.

An additional representative method for processing a video in stages includes obtaining a video block of the video and transforming, via a transform unit, video residual data using a single one-dimensional transform to generate a set of coefficients associated with the video block, as an output result of a first one of the stages. The additional representative method also includes quantizing, via a quantization unit, the set of transformed coefficients to generate a set of quantized coefficients, as an output result of a second one of the stages and dequantizing, via an inverse quantization unit, the set of quantized coefficients to generate a set of dequantized, transformed coefficients, as an output result of a third one of the stages. The additional representative method further includes detransforming, via an inverse transform unit, the set of dequantized, transformed coefficients, as an output result of a fourth one of the stages, using a single one-dimensional inverse transform to generate the reconstructed video. After one or more of the stages, the outputted coefficients are bit-shifted.

A still further representative method for processing video includes obtaining a video block of the video and selecting or determining a quantization parameter for quantizing as a function of N, where N is an integer number of dimensions of a transform used in the processing of the video block. The still further representative method includes quantizing, via a quantization unit, transformed or untransformed video residual data using the selected or determined quantization parameter to generate a first set of quantized data and dequantizing, via an inverse quantization unit, the first set of quantized data using the selected or determined quantization parameter to generate a second set of dequantized data.

A yet further method for processing video includes obtaining, via a transmit/receive unit, a first set of encoded quantized data associated with a video block of the video, selecting or determining a quantization parameter for quantizing as a function of N (where N is an integer number of dimensions of a transform used in the processing of the video block), entropy decoding, via an entropy decoding unit, the first set of quantized data, and dequantizing, via an inverse quantization unit, the first set of decoded, quantized data using the selected or determined quantization parameter to generate a second set of dequantized data.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A more detailed understanding may be had from the Detailed Description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the Figures indicate like elements, and wherein:

FIG. 7 is a flow chart illustrating another representative method for processing video residual data.

FIG. 8 is a flow chart illustrating a further representative method for processing a video;

FIG. 9 is a flow chart illustrating an additional representative method for processing a video;

FIG. 12 is a table illustrating representative output dynamic range and number of right shifts at each stage (M=N);

FIG. 13 is a table illustrating representative output dynamic range and number of right shifts, if only horizontal transform is used;

FIG. 14 is a table illustrating representative output dynamic range and number of right shifts, if only vertical transform is used;

FIG. 15 is a table illustrating representative output dynamic range and number of right shifts, if transforms are skipped in both directions;

FIG. 16 is a table illustrating representative bits for right shift at the quantization and inverse quantization stages;

FIG. 17 is a table illustrating representative output Dynamic Range and number of right shifts for Horizontal Only (HO) and Vertical Only (VO) modes;

FIG. 18 is a table illustrating representative adjusted scaling factors for quantization and inverse quantization; and FIG. 19 is a table illustrating representative bits of right shift for quantization and inverse quantization after scaling factor adjustment.

DETAILED DESCRIPTION

Figure 1A:
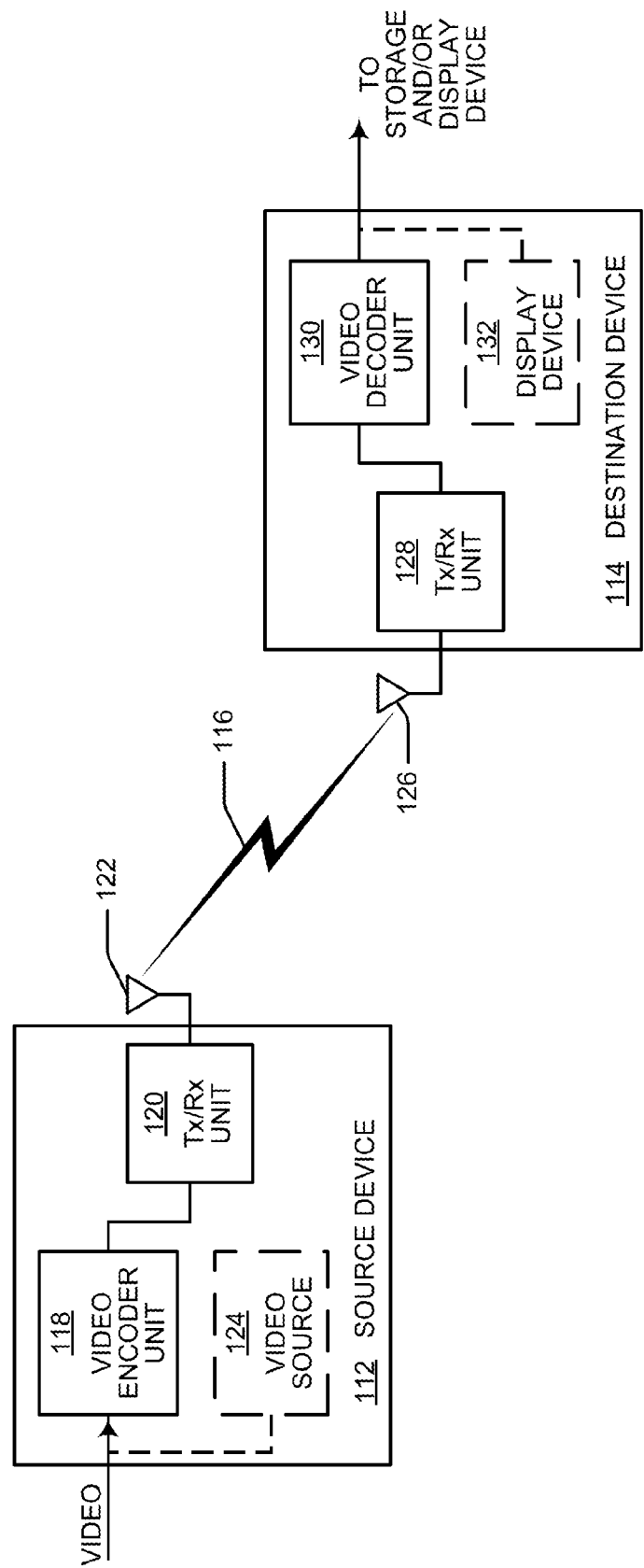
FIG. 1A is a block diagram illustrating an example video encoding and decoding system in which one or more embodiments may be carried out and/or implemented.

FIG. 1A is a block diagram illustrating an example video encoding and decoding system 100 in which one or more embodiments may be carried out and/or implemented. The system 100 may include a source device 112 that may transmit encoded video information to a destination device 114 via a communication channel 116.

The source device 112 and/or destination device 114 may be any of a wide range of devices. In some representative embodiments, the source device 112 and/or the destination device 114 may include wireless transmit and/or receive units (WTRUs), such as wireless handsets or any wireless devices that can communicate video information over the communication channel 116, in which case, communication channel 116 includes a wireless link. The methods, apparatuses and systems described, disclosed or otherwise provided explicitly, implicitly and/or inherently (collectively "provided") herein, however, are not necessarily limited to wireless applications or settings. For example, these techniques may apply to over-the-air television broadcasts, cable television transmissions, satellite television transmissions, Internet video transmissions, encoded digital video that is encoded onto a storage medium, and/or other scenarios. The communication channel 116 may include and/or may be any combination of wireless or wired media suitable for transmission of encoded video data.

The source device 112 may include a video encoder unit 118, a transmit and/or receive (Tx/Rx) unit 120 and/or a Tx/Rx element 122. As shown, the source device 112 may include a video source 124. The destination device 114 may include a Tx/RX element 126, a Tx/Rx unit 128 and/or a video decoder unit 130. As shown, the destination device 114 may include a display device 132. Each of the Tx/Rx units 120, 128 may be or may include a transmitter, a receiver or a combination of a transmitter and a receiver (e.g., a transceiver or transmitter-receiver). Each of the Tx/Rx elements 122, 126 may be, for example, an antenna. In accordance with this disclosure, the video encoder unit 118 of the source device 112 and/or the video decoder unit 130 of the destination device 114 may be configured and/or adapted (collectively "adapted") to apply the coding techniques provided herein.

The source and destination devices 112, 114 may include other elements/components or arrangements. For example, the source device 112 may be adapted to receive video data from an external video source. The destination device 114 may interface with an external display device (not shown) and/or may include and/or use the (e.g., integrated) display device 132. In some embodiments, a data stream generated by the video encoder unit 118 may be conveyed to other devices without modulating the data onto a carrier signal, such as by direct digital transfer and the other devices may or may not modulate the data for transmission.

The techniques provided herein may be performed by any digital video encoding and/or decoding device. Although generally the techniques provided herein are performed by separate video encoding and/or video decoding devices, the techniques may also be performed by a combined video encoder/decoder, typically referred to as a "CODEC." The techniques provided herein may also be performed by a video preprocessor or the like. The source device 112 and the destination device 114 are merely examples of such coding devices in which the source device 112 may generate (and/or may receive video data and may generate) the encoded video information for transmission to the destination device 114. In some representative embodiments, the source an destination devices 112, 114 may operate in a substantially symmetrical manner such that each of the devices 112, 114 may include both video encoding and decoding components and/or elements (collectively "elements"). Hence, the system 100 may support any of one-way and two-way video transmission between the source and destination devices 112, 114 (e.g., for any of video streaming, video playback, video broadcasting, video telephony and/or video conferencing, among others). In certain representative embodiments, the source device 112 may be, for example, a video streaming server adapted to generate (and/or receive the video data and to generate) the encoded video information for one or more destination devices, where the destination devices may be in communication with the source device 112 over wired and/or wireless communication systems.

The external video source and/or the video source 124 may be and/or include a video capture device, such as a video camera, a video archive containing previously captured video, and/or a video feed from a video content provider. In certain representative embodiments, the external video source and/or the video source 124 may generate computer graphics-based data as the source video, or a combination of live video, archived video, and/or computer-generated video. In certain representative embodiments, when the video source 124 is a video camera, the source device 112 and destination device 114 may be or may embody camera phones or video phones.

The captured, pre-captured, computer-generated video, video feed, and/or other type of the video data (collectively "un-encoded video") may be encoded by the video encoder unit 118 to form the encoded video information. The Tx/Rx unit 120 may modulate the encoded video information (e.g., according to a communication standard, to form one or more modulated signals carrying the encoded video information). The Tx/Rx unit 120 may pass the modulated signals to its transmitter for transmission. The transmitter may transmit the modulated signals via the Tx/Rx element 122 to the destination device 114.

At the destination device 114, the Tx/Rx unit 128 may receive the modulated signals from over channel 116 via the Tx/Rx element 126. The Tx/Rx unit 128 may demodulate the modulated signals to obtain the encoded video information. The Tx/RX unit 128 may pass the encoded video information to the video decoder unit 130.

The video decoder unit 130 may decode the encoded video information to obtain decoded video data. The encoded video information may include syntax information defined by the video encoder unit 118. This syntax information may include one or more elements ("syntax elements"); some or all of which may be useful for decoding the encoded video information. The syntax elements may include, for example, characteristics of the encoded video information. The syntax elements may also include characteristics, and/or describe the processing, of the un-encoded video used to form the encoded video information.

The video decoder unit 130 may output the decoded video data for later storage and/or display on the external display (not shown). In certain representative embodiments, the video decoder unit 130 may output the decoded video data to the display device 132. The display device 132 may be and/or may include any individual, multiple, combination, of a variety of display devices adapted to display the decoded video data to a user. Examples of such display devices include a liquid crystal display (LCD), a plasma display, an organic light emitting diode (OLED) display, and/or a cathode ray tube (CRT), among others.

The communication channel 116 may be any wireless or wired communication medium, such as a radio frequency (RF) spectrum or one or more physical transmission lines, or any combination of wireless and wired media. The communication channel 116 may form part of a packet-based network, such as a local area network, a wide-area network, or a global network, such as the Internet. The communication channel 116 generally represents any suitable communication medium, or collection of different communication media, for transmitting video data from the source device 112 to the destination device 114, including any suitable combination of wired and/or wireless media. The communication channel 116 may include routers, switches, base stations, and/or any other equipment that may be useful to facilitate communication from the source device 112 to the destination device 114. Details of an example communications system, which may facilitate such communication between the devices 112, 114, are provided below with reference to FIG. 5A-5E. Details of devices that may be representative of the source and destination devices 112, 114 are provided below, as well.

The video encoder unit 118 and the video decoder unit 130 may operate according to one or more standards and/or specifications, such as, for example, MPEG-2, H.261, H.263, H.264, H.264/AVC, and/or H.264 as extended according to SVC extensions ("H.264/SVC"), among others. One of skill understands that the methods, apparatus and/or systems set forth herein are applicable to other video encoders, decoders, and/or CODECs implemented according to (and/or compliant with) different standards, or to proprietary video encoders, decoders and/or CODECs, including future video encoders, decoders and/or CODECs. The techniques set forth herein are not limited to any particular coding standard.

Relevant portions of H.264/AVC noted above are available from the International Telecommunications Union as ITU-T Recommendation H.264, or more specifically, "ITU-T Rec. H.264 and ISO/IEC 14496-10 (MPEG4-AVC), 'Advanced Video Coding for Generic Audiovisual Services,' v5, March, 2010;" which is incorporated herein by reference, and which may be referred to herein as the H.264 standard, H.264 specification, the H.264/AVC standard and/or specification. The techniques provided herein may be applied to devices that conform to (e.g., generally conform to) the H.264 standard.

Although not shown in FIG. 1A, each of the video encoder and video decoder units 118, 130 may include and/or be integrated with an audio encoder and/or an audio decoder (as appropriate). The video encoder and video decoder units 118, 130 may include appropriate MUX-DEMUX units, or other hardware and/or software, to handle encoding of both audio and video in a common data stream and/or separate data streams. If applicable, the MUX-DEMUX units may conform, for example, to the ITU-T Recommendation H.223 multiplexer protocol and/or other protocols such as the user datagram protocol (UDP).

One or more video encoder and/or video decoder units 118, 130 may be included in one or more encoders and/or decoders; any of which may be integrated as part of a CODEC, and may be integrated and/or combined with a respective camera, computer, mobile device, subscriber device, broadcast device, set-top box and/or server, among others. The video encoder unit 118 and/or the video decoder unit 130 may be implemented as any of a variety of suitable encoder and/or decoder circuitries, respectively, such as one or more microprocessors, digital signal processors (DSPs), application specific integrated circuits (ASICs), field programmable gate arrays (FPGAs), discrete logic, software, hardware, firmware or any combinations thereof. Either or both of the video encoder and video decoder units 118, 130 may be implemented substantially in software, and operations of the elements of the video encoder unit 118 and/or the video decoder unit 130 may be performed by appropriate software instructions executed by one or more processors (not shown). Such an embodiment, in addition to the processor, may contain off-chip components, for example, external storage (e.g., in the form of non-volatile memory) and/or input/output interfaces, among others.

In any embodiment in which operations of elements of the of the video encoder and/or video decoder units 118, 130 may be performed by software instructions executed by one or more processors, the software instructions may be maintained on a computer readable medium including, for example, magnetic disks, optical disks, any other volatile (e.g., Random Access Memory ("RAM")) non-volatile (e.g., Read-Only Memory ("ROM")), and/or mass storage system readable by the CPU, among others. The computer readable medium may include cooperating or interconnected computer readable medium, which may exist exclusively on the processing system and/or are distributed among multiple interconnected processing systems that may be local or remote to the processing system.

Figure 1B:
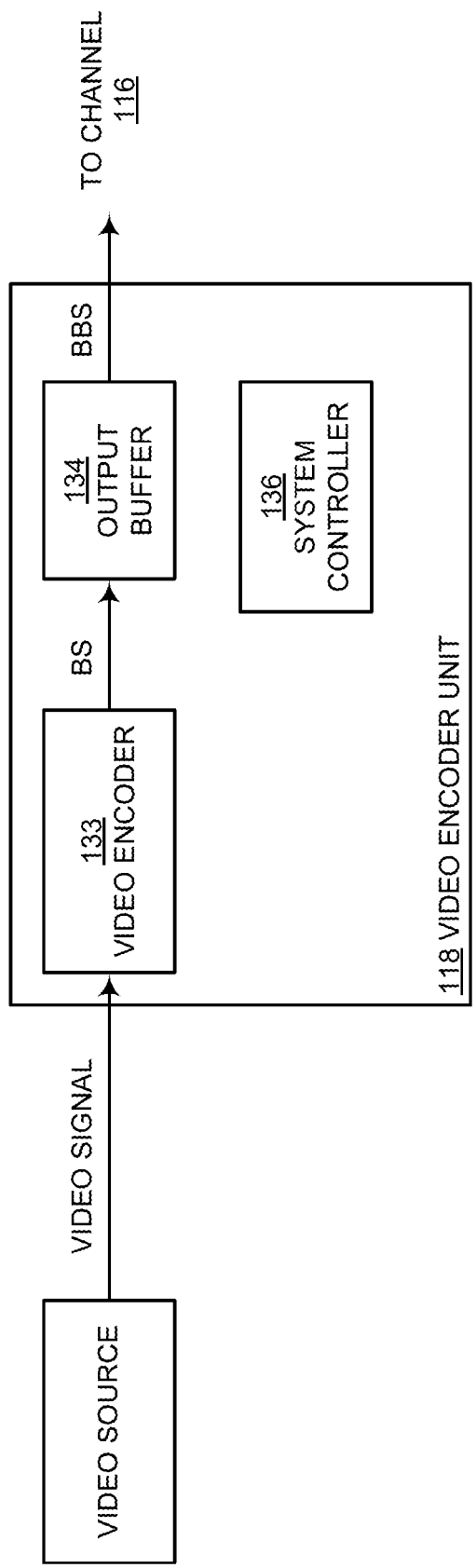
FIG. 1B is a block diagram illustrating an example video encoder unit for use with the video encoding and/or decoding system of FIG. 1A.

FIG. 1B is a block diagram illustrating an example video encoder unit 118 for use with a video encoding and/or decoding system, such as the system 100. The video encoder unit 118 may include a video encoder 133, an output buffer 134, and a system controller 136. The video encoder 133 (or one or more elements thereof) may be implemented according to one or more standards and/or specifications, such as, for example, H.261, H.263, H.264, H.264/AVC, SVC extensions of H.264/AVC (H.264/AVC Annex G), and/or HEVC, among others. One of skill understands the methods, apparatus and/or systems provided herein may be applicable to other video encoders implemented according to different standards and/or to proprietary CODECs, including future CODECs.

The video encoder 133 may receive a video signal provided from a video source, such as, the video source 124 and/or the external video source. This video signal may include the un-encoded video. The video encoder 133 may encode the un-encoded video, and provide an encoded (i.e., compressed) video bitstream (BS) at its output.

The encoded video bitstream BS may be provided to an output buffer 134. The output buffer 134 may buffer the encoded video bitstream BS, and may provide such encoded video bitstream BS, as a buffered bitstream (BBS), for transmission via the communication channel 116.

The buffered bitstream BBS output from the output buffer 134 may be sent to a storage device (not shown) for later viewing or transmission. In certain representative embodiments, the video encoder unit 118 may be configured for visual communication in which the buffered bitstream BBS may be transmitted via the communication channel 116 at a specified constant and/or variable bit rate (e.g., with a delay (for example, a very low or minimal delay)).

The encoded video bitstream BS, and in turn, the buffered bitstream BBS may carry bits of the encoded video information. The bits of the buffered bitstream BBS may be arranged as a stream of encoded video frames. The encoded video frames may be intra-coded frames (e.g., I-frames), or inter-coded frames (e.g., B-frames and/or P-frames). The stream of encoded video frames may be arranged, for example, as a series of Groups of Pictures (GOPs), with the encoded video frames of each GOP arranged in a specified order. Generally, each GOP may start with an intra-coded frame (e.g., an I-frame) followed by one or more inter-coded frames (e.g., P-frames and/or B-frames). Each GOP may include only a single intra-coded frame; although any of the GOPs may include multiples. It is contemplated that B-frames might not be used for real-time, low delay applications as, for example, bi-directional prediction may cause extra coding delay compared to uni-directional prediction (P-frames). Additional and/or other frame types may be used and the particular ordering of the encoded video frames may be modified as understood by one skilled in the art.

Each GOP may include syntax data ("GOP syntax data"). The GOP syntax data may be disposed in a header of the GOP, in a header of one or more frames of the GOP, and/or elsewhere. The GOP syntax data may indicate ordering, quantity, or type, and/or describe the encoded video frames of the respective GOP. Each encoded video frame may include syntax data ("encoded-frame syntax data"). The encoded-frame syntax data may indicate and/or describe an encoding mode for the respective encoded video frame.

The system controller 136 may monitor various parameters and/or constraints associated with the channel 116, computational capabilities of the video encoder unit 118, demands by the users, etc., and may establish target parameters to provide an attendant quality of experience (QoE) suitable for the specified constraints and/or conditions of the channel 116. One or more of the target parameters may be adjusted from time to time or periodically depending upon the specified constraints and/or channel conditions. As an example, the QoE may be assessed quantitatively using one or more metrics for assessing video quality, including, for example, a metric commonly referred to as relative perceptive quality of encoded video sequences. The relative perceptive quality of encoded video sequences, measured, for example, using a peak-signal-to-noise ratio ("PSNR") metric, may be controlled by a bit rate (BR) of the encoded bitstream BS. One or more of the target parameters (including, for example, a quantization parameter (QP)) may be adjusted to maximize the relative perceptive quality of video within the constraints associated with the bite rate of the encoded bitstream BS.

Figure 2:
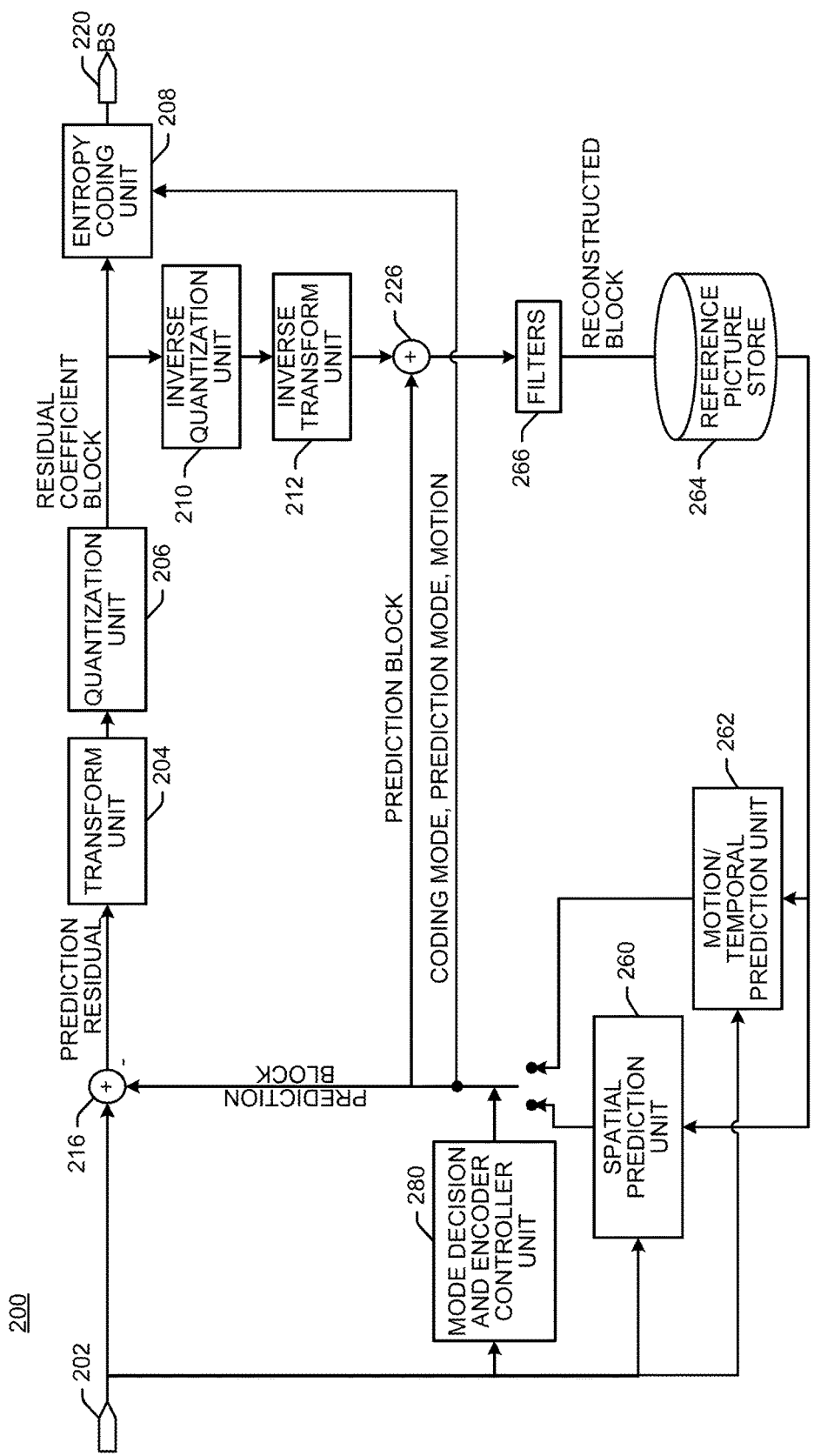
FIG. 2 is a block diagram of a generic block-based hybrid video encoding system.

FIG. 2 is a block diagram of a block-based hybrid video encoder 200 for use with a video encoding and/or decoding system, such as system 100.

Referring to FIG. 2, the block-based hybrid encoding system 200 may include a transform unit 204, a quantization unit 206, an entropy coding unit 208, an inverse quantization unit 210, an inverse transform unit 212, an first adder 216, a second adder 226, a spatial prediction unit 260, a motion/temporal prediction unit 262, a reference picture store 264, one or more filters 266 (e.g., loop filters) and/or a mode decision and encoder controller unit 280, among others.

Details of the video encoder 200 are meant merely to be illustrative, and real world implementations may differ. A real world implementation, for example, may include more, fewer and/or different elements, and/or may be arranged differently from the arrangement shown in FIG. 2. For example, although shown separately, some or all functionality of both of the transform unit 204 and quantization unit 206 may be highly integrated in some of the real-world implementations, such as, for example, implementations that use the core transform of the H.264 standard. Similarly, the inverse quantization unit 210 and inverse transform unit 212 may be highly integrated in some of the real-world implementations (e.g., H.264-standard-compliant implementations), but are likewise illustrated separately for conceptual purposes.

As described above, the video encoder 200 may receive the video signal at its input 202. The video encoder 200 may generate the encoded video information from the received un-encoded video, and output the encoded video information (e.g., any of intra-frames or inter-frames) from its output 220 in the form of the encoded video bitstream BS. The video encoder 200 may operate, for example, as a hybrid video encoder, and employ a block-based coding process for encoding the un-encoded video. When performing such an encoding process, the video encoder 200 may operate on individual frames, pictures, and/or images (collectively "un-encoded pictures") of the un-encoded video.

To facilitate the block-based encoding process, the video encoder 200 may slice, partition, divide, and/or segment (collectively "segment") each un-encoded picture received at its input 202 into multiple un-encoded video blocks. For example, the video encoder 200 may segment the un-encoded picture into multiple un-encoded video segments (e.g., slices) and may (e.g., then may) segment each of the un-encoded video segments into the un-encoded video blocks. The video encoder 200 may pass, supply, send, or provide the un-encoded video blocks to the spatial prediction unit 260, the motion/temporal prediction unit 262, the mode decision and encoder controller unit 280 and/or the first adder 216. As described in more detail below, the un-encoded video blocks may be provided on a block-by-block basis.

The spatial prediction unit 260 may receive the un-encoded video blocks, and encode such video blocks in intra-mode. Intra-mode refers to any of several modes of spatial-based compression, and encoding in intra-mode endeavors to provide spatial-based compression of the un-encoded picture. The spatial-based compression, if any, may result from reducing or removing spatial redundancy of video information within the un-encoded picture. In forming the prediction blocks, the spatial prediction unit 260 may perform spatial prediction (or "intra-prediction") of each un-encoded video block relative to one or more video blocks of the un-encoded picture that have been already encoded ("encoded video blocks") and/or reconstructed ("reconstructed video blocks"). The encoded and/or reconstructed video blocks may be neighbors of, adjacent to, or in proximity (e.g., close proximity) to, the un-encoded video block.

The motion/temporal prediction unit 262 may receive the un-encoded video blocks from the input 202, and encode them in inter-mode. Inter-mode refers to any of several modes of temporal-based compression, including, for example, P-mode (uni-directional prediction) and/or B-mode (bi-directional prediction). Encoding in inter-mode endeavors to provide temporal-based compression of the un-encoded picture. The temporal-based compression, if any, may result from reducing or removing temporal redundancy of the video information among the un-encoded picture and one or more reference (e.g., adjacent) pictures. The motion/temporal prediction unit 262 may perform temporal prediction (or "inter-prediction") of each un-encoded video block relative to one or more video blocks of the reference pictures ("reference video blocks"). The temporal prediction carried out may be uni-directional prediction (e.g., for P-mode) and/or bi-directional prediction (e.g., for B-mode).

For uni-directional prediction, the reference video blocks may be from one or more previously encoded and/or reconstructed pictures. The encoded and/or reconstructed picture or pictures may be neighbors of, adjacent to, and/or in proximity to, the un-encoded picture.

For bi-directional prediction, the reference video blocks may be from one or more previously encoded and/or reconstructed pictures and one or more other un-encoded pictures of the video stream. The encoded and/or reconstructed pictures and the other un-encoded pictures may be neighbors of, adjacent to, and/or in proximity to, the un-encoded picture.

If multiple reference pictures are used (as may be the case for recent video coding standards such as H.264/AVC and/or HEVC), for each video block, its reference picture index may be sent to the entropy coding unit 208 for subsequent output and/or transmission. The reference index may be used to identify from which reference picture or pictures in the reference picture store 264 the temporal prediction comes.

Although typically highly integrated, functions of the motion/temporal prediction unit 262 for the motion estimation and motion compensation may be carried out by separate entities or units (not shown). Motion estimation may be carried out to estimate motion for each un-encoded video block relative to the reference-picture video blocks, and may involve generating a motion vector for the un-encoded video block. The motion vector may indicate a displacement of a prediction block relative to the un-encoded video block being coded. This prediction block is the reference-picture video block that is found to closely match, in terms of, for example, pixel difference of the un-encoded video block being coded. The matching may be determined by a sum of absolute difference (SAD), a sum of square difference (SSD), and/or other difference metrics. Motion compensation may involve fetching and/or generating the prediction block based on the motion vector determined by the motion estimation.

The motion/temporal prediction unit 262 may calculate the motion vector for the un-encoded video block by comparing the un-encoded video block to the reference video blocks from reference pictures stored in the reference picture store 264. The motion/temporal prediction unit 262 may calculate values for fractional pixel positions of a reference picture included in reference picture store 264. In some instances, the adder 226 or another unit of the video encoder 200 may calculate the fractional pixel position values for reconstructed video blocks, and may store the reconstructed video blocks, with the calculated values for the fractional pixel positions, in reference picture store 264. The motion/temporal prediction unit 262 may interpolate sub-integer pixels of the reference picture (e.g., of an I-frame and/or a P-frame).

The motion/temporal prediction unit 262 may be configured to encode the motion vector relative to a selected motion predictor. The motion predictor selected by the motion/temporal prediction unit 262 may be, for example, a vector equivalent to a mean of motion vectors of neighboring blocks that have already been encoded. To encode the motion vector for the un-encoded video block, the motion/temporal prediction unit 262 may calculate the difference between the motion vector and the motion predictor to form a motion vector difference value.

H.264 refers to a set of potential reference frames as a "list." A set of reference pictures stored in reference picture store 264 may correspond to such a list of reference frames. The motion/temporal prediction unit 262 may compare the reference video blocks of the reference pictures from reference picture store 264 to the un-encoded video block (e.g., of a P-frame or a B-frame). When the reference pictures in reference picture store 264 include values for sub-integer pixels, the motion vector calculated by motion/temporal prediction unit 262 may refer to a sub-integer pixel location of the reference picture. The motion/temporal prediction unit 262 may send the calculated motion vector to the entropy coding unit 208 and to the motion compensation functions of the motion/temporal prediction unit 262. The motion/temporal prediction unit 262 (or the motion compensation functions thereof) may calculate error values for the prediction block relative to the un-encoded video block being coded. The motion/temporal prediction unit 262 may calculate prediction data based on the prediction block.

The mode decision and encoder controller unit 280 may select one of the coding modes, intra-mode, or inter-mode. The mode decision and encoder controller unit 280 may do so based on a rate-distortion optimization method and/or on error results produced in each mode, for example.

The video encoder 200 may form a block of residuals ("residual video block") by subtracting the prediction data provided from motion/temporal prediction unit 262 from the un-encoded video block being coded. The adder 216 represents an element or multiple elements that may perform this subtraction operation.

The transform unit 204 may apply a transform to the residual video block to convert such residual video block from a pixel value domain to a transform domain, such as a frequency domain. The transform may be, for example, any of the transforms provided herein, a discrete cosine transform (DCT), or a conceptually similar transform. Other examples of the transform include those defined in H.264, wavelet transforms, integer transforms, and/or sub-band transforms, among others. Application of the transform to the residual video block by the transform unit 204 produces a corresponding block of transform coefficients of the residual video block ("residual-transform coefficients"). These residual-transform coefficients may represent magnitudes of frequency components of the residual video block. The transform unit 204 may forward the residual-transform coefficients to the quantization unit 206.

The quantization unit 206 may quantize the residual-transform coefficients to reduce further the encoded bit rate. The quantization process, for example, may reduce the bit depth associated with some or all of the residual-transform coefficients. In certain instances, the quantization unit 206 may divide the values of residual-transform coefficients by a quantization level corresponding to the QP to form a block of quantized transform coefficients. The degree of quantization may be modified by adjusting the QP value. The quantization unit 206 may apply the quantization to represent the residual-transform coefficients using a desired number of quantization steps; the number of steps used (or correspondingly the value of the quantization level) may determine the number of encoded video bits used to represent the residual video block. The quantization unit 206 may obtain the QP value from a rate controller (not shown). Following quantization, the quantization unit 206 may provide the quantized transform coefficients to the entropy coding unit 208 and to the inverse quantization unit 210.

The entropy coding unit 208 may apply entropy coding to the quantized transform coefficients to form entropy-coded coefficients (i.e., a bitstream). The entropy coding unit 208 may use adaptive variable length coding (CAVLC), context adaptive binary arithmetic coding (CABAC) and/or another entropy coding technique to form the entropy-coded coefficients. CABAC, as understood by those skilled in the art, may require input of contextual information ("context"). This context may be based on neighboring video blocks, for instance.

The entropy coding unit 208 may provide the entropy-coded coefficients along with the motion vectors in the form of a raw encoded video bitstream to an internal bitstream format (not shown). This bitstream format may form the encoded video bitstream BS provided to the output buffer 134 (FIG. 1B) by appending to the raw encoded video bitstream additional information, including headers and/or other information to enable, for example, the video decoder unit 300 (FIG. 3) to decode the encoded video block from the raw encoded video bitstream. Following the entropy coding, the encoded video bitstream BS provided from the entropy coding unit 208 may be output, for example, to the output buffer 134, and may be transmitted, for example, to the destination device 114 via the channel 116 or archived for later transmission or retrieval.

In certain representative embodiments, the entropy coding unit 208 or another unit of video encoder 133, 200 may be configured to perform other coding functions, in addition to entropy coding. For example, the entropy coding unit 208 may be configured to determine the Code Block Pattern (CBP) values for the video blocks. In certain representative embodiments, the entropy coding unit 208 may perform run length coding of the quantized transform coefficients in a video block. As an example, the entropy coding unit 208 may apply a zigzag scan or other scan pattern to arrange the quantized transform coefficients in a video block and encode runs of zeros for further compression. The entropy coding unit 208 may construct the header information with appropriate syntax elements for transmission in the encoded video bitstream BS.

The inverse quantization unit 210 and inverse transform unit 212 may apply inverse quantization and inverse transformation, respectively, to reconstruct a residual video block in the pixel domain, e.g., for later use as one of the reference video blocks (e.g., within one of the reference pictures in the reference picture list).

The mode decision and encoder controller unit 280 may calculate the reference video block by adding the reconstructed residual video block to the prediction block of one of the reference pictures stored in the reference picture store 264. The mode decision and encoder controller unit 280 may apply one or more interpolation filters to the reconstructed residual video block to calculate sub-integer pixel values (e.g., for half-pixel positions) for use in motion estimation.

The adder 226 may add the reconstructed residual video block to the motion compensated prediction video block to produce a reconstructed video block for storage in the reference picture store 264. The reconstructed (pixel value domain) video block may be used by the motion/temporal prediction unit 262 (or motion estimation functions thereof and/or the motion compensation functions thereof) as one of the reference blocks for inter-coding an un-encoded video block in subsequent un-encoded video.

The filters 266 (e.g., loop filters) may include a deblocking filter. The deblocking filter may operate to remove visual artifacts that may be present in reconstructed macro-blocks. These artifacts may be introduced in the encoding process due to, for example, the use of different modes of encoding such as I-type, P-type or B-type. Artifacts may be present, for example, at boundaries and/or edges of the received video blocks, and the de-blocking filter may operate to smooth the boundaries and/or edges of the video blocks to improve visual quality. The deblocking filter may filter the output of the adder 226.

Figure 3:
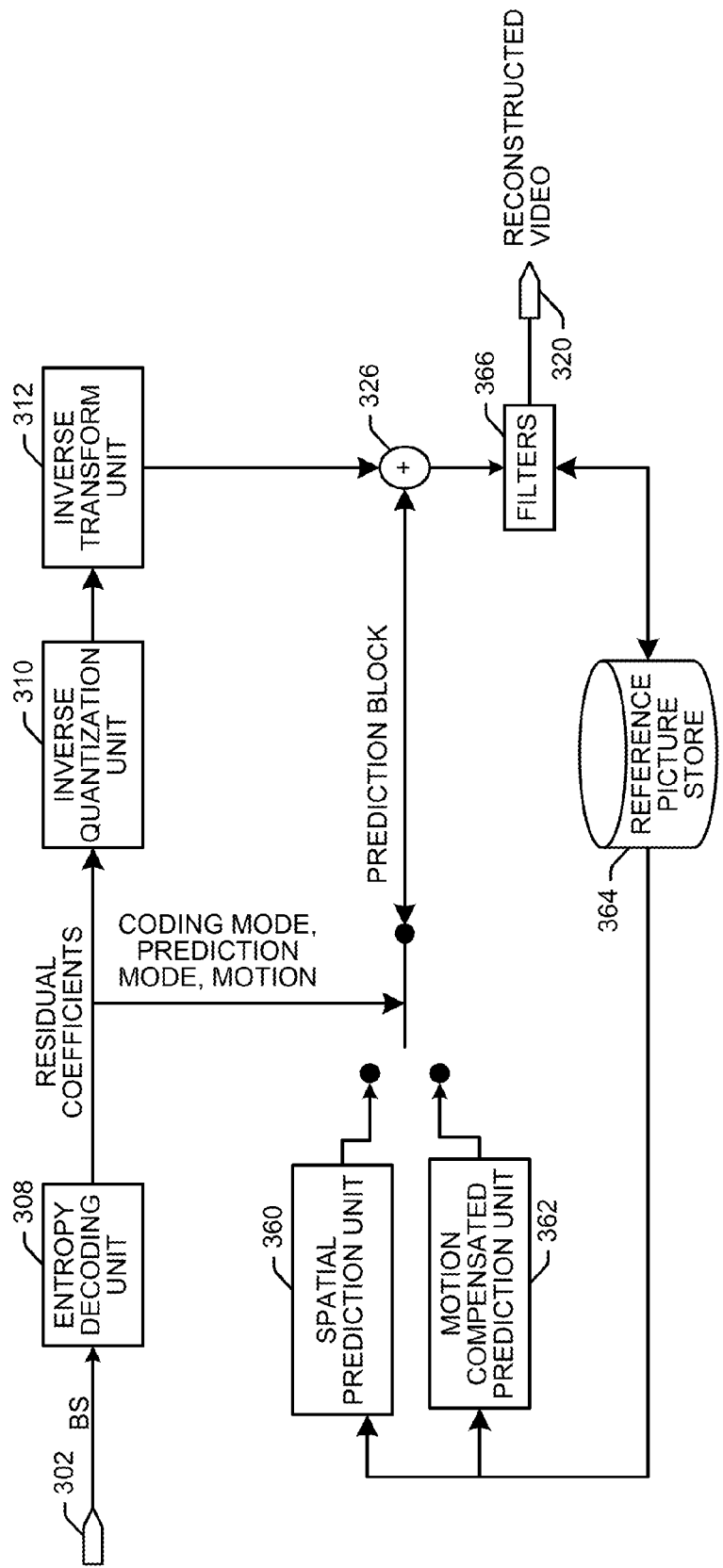
FIG. 3 is a general block diagram of a block-based video decoder.

FIG. 3 is a block diagram illustrating an example of a video decoder 300 for use with a video decoder unit, such as the video decoder unit 130 of FIG. 1A. The video decoder 300 may include an input 302, entropy decoding unit 308, a motion compensated prediction unit 362, a spatial prediction unit 360, an inverse quantization unit 310, an inverse transform unit 312, a reference picture store 364, filters 366, an adder 326 and an output 320. The video decoder 300 may perform a decoding process that is, generally, reciprocal to the encoding process provided with respect to the video encoder 133, 200. This decoding process may be carried out as set forth below.

The motion compensated prediction unit 362 may generate prediction data based on motion vectors received from the entropy decoding unit 308. The motion vectors may be encoded relative to a motion predictor for a video block corresponding to the encoded motion vector. The motion compensated prediction unit 362 may determine the motion predictor, for example, as the median of motion vectors of blocks neighboring the video block to be decoded. After determining the motion predictor, the motion compensated prediction unit 362 may decode the encoded motion vector by extracting a motion vector difference value from the encoded video bitstream BS and adding the motion vector difference value to the motion predictor. The motion compensated prediction unit 362 may quantize the motion predictor to the same resolution as the encoded motion vector. In certain representative embodiments, the motion compensated prediction unit 362 may use the same precision for some or all encoded motion predictors. As another example, the motion compensated prediction unit 362 may be configured to use either of the above methods, and to determine which method to use by analyzing data included in a sequence parameter set, slice parameter set, or picture parameter set obtained from the encoded video bitstream BS.

After decoding the motion vector, the motion compensated prediction unit 362 may extract a prediction video block identified by the motion vector from a reference picture of reference picture store 364. If the motion vector points to a fractional pixel position, such as a half-pixel, the motion compensated prediction unit 362 may interpolate values for the fractional pixel positions. The motion compensated prediction unit 362 may use adaptive interpolation filters or fixed interpolation filters to interpolate these values. The motion compensated prediction unit 362 may obtain indicia of which of the filters 366 to use, and in various representative embodiments, coefficients for the filters 366, from the received encoded video bitstream BS.

The spatial prediction unit 360 may use intra prediction modes received in the encoded video bitstream BS to form a prediction video block from spatially adjacent blocks. Inverse quantization unit 310 may inverse quantize, (e.g., de-quantize, quantized block coefficients provided in the encoded video bitstream BS and decoded by the entropy decoding unit 308). The inverse quantization process may include a conventional process, e.g., as defined by H.264. The inverse quantization process may include use of a quantization parameter QP calculated by the video encoder 133, 200 for each video block to determine a degree of quantization and/or a degree of inverse quantization to be applied.

The inverse transform unit 312 may apply an inverse transform (e.g., an inverse of any of the transforms provided herein, inverse DCT, an inverse integer transform, or a conceptually similar inverse transform process) to the transform coefficients to produce residual video blocks in the pixel domain. The motion compensated prediction unit 362 may produce motion compensated blocks, and may perform interpolation based on interpolation filters. Identifiers for interpolation filters to be used for motion estimation with sub-pixel precision may be included in syntax elements of the video block. The motion compensated prediction unit 362 may use the interpolation filters as used by the video encoder 133, 200 during encoding of the video block to calculate interpolated values for sub-integer pixels of a reference block. The motion compensated prediction unit 362 may determine the interpolation filters used by the video encoder 133, 200 according to received syntax information and use the interpolation filters to produce prediction blocks.

The motion compensated prediction unit 262 may use: (1) the syntax information to determine sizes of the video blocks used to encode one or more pictures of the encoded video sequence; (2) partition information that describes how each video block of a frame of the encoded video sequence is partitioned; (3) modes (or mode information) indicating how each partition is encoded; (4) one or more reference pictures for each inter-encoded video block, and/or (5) other information to decode the encoded video sequence.

The adder 326 may sum the residual blocks with the corresponding prediction blocks generated by the motion compensated prediction unit 362 or the spatial prediction unit 360 to form decoded video blocks. Deblocking filters 366 (e.g., filters or loop filters) may be applied to filter the decoded video blocks to remove blockiness artifacts. The decoded video blocks may be stored in reference picture store 364, which may provide the reference video blocks for subsequent motion compensation and may produce decoded video for presentation on a display device (not shown).

As each video block undergoes the encoding and/or decoding process, the video information associated with the video block may be represented differently. For example, the video block may include: (i) pixel data in the pixel domain; (ii) residual data ("residuals") representing pixel differences between an un-encoded video blocks and a prediction block; (iii) transform coefficients in the transform domain (e.g., following application of a transform); and (iv) quantized transform coefficients in the quantized transform domain.

Each video block may have given dimensions or, collectively "size". The video block size may depend on the coding standard. As an example, the H.264 standard supports intra prediction in various video block sizes, such as 16×16, 8×8, or 4×4 for luma components, and 8×8 for chroma components, and supports inter prediction in various block sizes, such as 16×16, 16×8, 8×16, 8×8, 8×4, 4×8, and 4×4 for luma components and corresponding scaled sizes for chroma components. In the H.264 standard, a video block of dimensions 16 pixels by 16 pixels is generally referred to as a macroblock (MB), and a video block with less than 16 pixels by 16 pixels is generally referred to as a partition of the MB ("MB partition"). In HEVC, a video block called a "coding unit" or "CU" may be used to compress high resolution (e.g., 1080p and beyond) video signals more efficiently. In HEVC, the CU size is set in a parameter sequence set, and may be set as large as 64×64 pixels or as small as 4×4 pixels. The CU can be further partitioned into prediction units (PUs), for which separate prediction methods may be applied. Each video block (whether a MB, CU, and/or PU, among others) may be processed by using the spatial prediction unit 360 and/or the motion/temporal prediction unit 362.

As used herein, "N×N" and "N by N" may be used interchangeably to refer to a size of the block in terms of components (e.g., pixels, residuals, transform coefficients, and/or quantized transform coefficients, among others) in both vertical and horizontal dimensions. In general, a 16×16 video block has 16 elements in a vertical direction (y=16) and 16 elements in a horizontal direction (x=16). An N×N block, generally, has N elements in a vertical direction and N elements in a horizontal direction, where N represents a nonnegative integer value. The elements in a video block may be arranged in rows and columns. The video blocks may have the same or a different number of pixels in the horizontal direction as in the vertical direction. For example, the video blocks may include N×M pixels, where M is or is not equal to N.

The H.264/AVC standard specifies order-4 and order-8 integer transforms, namely, $T_4$ and $T_8$, as set forth below:

$$T_4 = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \quad (1)$$

-continued $$T_8 = \begin{bmatrix} 8 & 8 & 8 & 8 & 8 & 8 & 8 & 8 \\ 12 & 10 & 6 & 3 & -3 & -6 & -10 & -12 \\ 8 & 4 & -4 & -8 & -8 & -4 & 4 & 8 \\ 10 & -3 & -12 & -6 & 6 & 12 & 3 & -10 \\ 8 & -8 & -8 & 8 & 8 & -8 & -8 & 8 \\ 6 & -12 & 3 & 10 & -10 & -3 & 12 & -6 \\ 4 & -8 & 8 & -4 & -4 & 8 & -8 & 4 \\ 3 & -6 & 10 & -12 & 12 & -10 & 6 & -3 \end{bmatrix} \quad (2)$$

These two integer transforms, $T_4$ and $T_8$, are orthogonal, and have very low complexity. The basis vectors of such transforms are substantially different from the DCT, and therefore performance may be worse than the DCT. The norms of the basis vectors are different from each other. For reversibility and energy conservation, a scaling process has to be carried after transform to compensate for the drawback, which may increase computational complexity and memory usage. Such scaling matrices often differ from transform to transform. For example, the order-4 and order-8 transforms, $T_4$ and $T_8$, may require the use of different scaling matrices. The use of different scaling matrices may also complicate CODEC design and implementation, and may make it more difficult to support additional transforms.

As noted above, in HEVC, the CU size and PU size may be as large as 64×64 elements, and transforms larger than order-4 and order-8 are used. Four transform sizes may used in HEVC including order-4, order-8, order-16, and/or order-32.

With reference to FIGS. 2 and 3, for the video encoder 200 and video decoder 300, a dynamic range of the input to the transform unit 204 of the video encoder 200 and the dynamic range of the output of inverse transform unit 312 of the video decoder 300 may be the same. For transform operations in the video encoder 200 and/or the video decoder 300, this dynamic range may be detected, and represented by a bit-depth, ("BD"). As an example, if the dynamic range is [−255, 255], then BD is equal to 8. If the dynamic range is [−1023, 1023], BD is equal to 10. After determining the dynamic range, a variable ΔBD may be calculated. The variable ΔBD may be calculated as BD-8, for example.

In the video encoder 200, a prediction residual block $X_{M \times N}$, of which the size is M×N (M, N∈{4, 8, 16, 32}), may be processed in the transform unit 204, the quantization unit 206, the inverse quantization unit 210 and the inverse transform unit 212, sequentially. These four operations of video processing are provided in more detail below. As used herein, the operations carried out in the inverse quantization unit 210 and inverse transform unit 212 may be referred as to dequantization and detransformation, respectively. In the video decoder 300, the operations carried out in the inverse quantization unit 310 and inverse transform unit 312 are typically the same as those carried out in the inverse quantization unit 210 and the inverse transform unit 212.

Forward Transform

The input to a forward transform may be a prediction residual block, denoted as $X_{M \times N}$. To perform a 2 dimensional (2-D) forward transform on $X_{M \times N}$, the M rows and N columns in $X_{M \times N}$ are transformed in each dimension sequentially, which are known as the horizontal and vertical forward transforms, respectively. Either the horizontal transform or the vertical forward transform may be formed first. If the horizontal forward transform is performed first, $X_{M \times N}$ may be right-multiplied by $T_N^T$ first (the superscript T means transposition) and right shifted with a proper number of bits in order to accommodate 16-bit arithmetic. The result may be $U_{M \times N}$, as follows:

$$U_{M \times N} = (X_{M \times N} \times T_N^T + f_{fwd,h}) >> (\log_2(N) + \Delta BD) \quad (3)$$

where $T_N$ (N∈{4, 8, 16, 32}) as above and ">>" means right shifting. The factor $f_{fwd,h}$ is for rounding, and may be in the range [0, $2^{(\log_2(N)+\Delta BD)}$]. For simplicity of exposition herein, $f_{fwd,h}$ may be equal to $2^{(\log_2(N)+\Delta BD-1)}$.

After the horizontal forward transform, a vertical forward transform may be performed on the intermediate block $U_{M \times N}$. The process of vertical forward transform may be as follows:

$$Y_{M \times N} = (T_M \times U_{M \times N} + f_{fwd,v}) >> (\log_2(M) + 7) \quad (4)$$

where the factor $f_{fwd,v}$ may be in the range [0, $2^{(\log_2(M)+7)}$], and, for simplicity of exposition herein, may be equal to $2^{(\log_2(M)+6)}$.

If the vertical forward transform is performed first, $X_{M \times N}$ may be left-multiplied by $T_M$ first and right shifted with a proper number of bits in order to fit 16-bit arithmetic. The result may be $U_{M \times N}$, as follows:

$$U_{M \times N} = (T_M \times X_{M \times N} + f_{fwd,v}) >> (\log_2(M) + \Delta BD) \quad (5)$$

where the factor $f_{fwd,v}$ is for rounding, and may be in the range [0, $2^{(\log_2(M)+\Delta BD)}$]. For simplicity of exposition herein, the $f_{fwd,v}$ may be equal to $2^{(\log_2(M)+\Delta BD-1)}$.

After the vertical forward transform, horizontal forward transform may be performed on the intermediate block $U_{M \times N}$. The process of horizontal forward transform may be as follows:

$$Y_{M \times N} = (U_{M \times N} \times T_N^T + f_{fwd,h}) >> (\log_2(N) + 7) \quad (6)$$

where the factor $f_{fwd,h}$ is in the range [0, $2^{(\log_2(N)+7)}$], and, for simplicity of exposition herein, may be equal to $2^{(\log_2(N)+6)}$.

Quantization

The input of quantization may be the output of the 2-D forward transform, (e.g., $Y_{M \times N}$). The quantization process for all the elements in $Y_{M \times N}$ may be either the same or different. Given an element $Y_{M \times N}(i,j)$ (0≤i≤M−1, 0≤j≤N−1) and the associated quantization stepsize $W_{M \times N}(i,j)$, the quantization process may be as set forth in Equation 7, as follows:

$$Z_{M \times N}(i, j) = (Y_{M \times N}(i, j) \times S_{M \times N}(i, j) + f_{M \times N,q}(i, j)) \gg \quad (7)$$
$$\left( Q_{M \times N}(i, j) + 7 - \frac{1}{2}\log_2(M \times N) - \Delta BD \right)$$

where $f_{M \times N,q}(i,j)$ is a factor for rounding, and may be in the range [0, $$2^{(Q_{M \times N}(i,j)+7-\frac{1}{2}\log_2(M \times N)-\Delta BD)}].$$

For simplicity of exposition herein, the $f_{M \times N,q}(i,j)$ may be equal to $$2^{(Q_{M \times N}(i,j)+6-\frac{1}{2}\log_2(M \times N)-\Delta BD)}.$$

In Equation (7), $S_{M \times N}(i,j)$ and $Q_{M \times N}(i,j)$ may satisfy a relationship as set forth in the Approximation (8) as follows:

$$\frac{S_{M \times N}(i, j)}{2^{Q_{M \times N}(i,j)}} \approx \frac{1}{W_{M \times N}((i, j)} \quad (8)$$

where ≈ means multiplying $S_{M \times N}(i,j)$ and then right shifting $Q_{M \times N}(i,j)$ bits and may be used to approximate dividing by the quantization stepsize $W_{M \times N}(i,j)$. More precise approximation may be achieved by increasing the number of right shifting bits $Q_{M \times N}(i,j)$.

Dequantization

Dequantization may be used to reconstruct $Y_{M \times N}$, using the input $Z_{M \times N}$. The reconstructed block is denoted as $Y'_{M \times N}$. Intuitively, $Y'_{M \times N}(i,j)$ may be equal to $Z_{M \times N}(i,j)$ multiplied by the quantization stepsize $W_{M \times N}(i,j)$. However, $W_{M \times N}(i,j)$ might not necessarily be an integer, and therefore, the approximation similar to Approximation (8) may also be performed for dequantization, as in Approximation (9) as follows:

$$\frac{D_{M \times N}(i, j)}{2^{IQ_{M \times N}(i,j)}} \approx W_{M \times N}((i, j)) \quad (9)$$

Similarly, large $IQ_{M \times N}(i,j)$ may mean high precision. The dequantization process may be as set forth in Equation (10), as follows:

$$Y'_{M \times N}(i, j) = (Z_{M \times N}(i, j) \times D_{M \times N}(i, j) + f_{M \times N, dq}(i, j)) \gg \left( IQ_{M \times N}(i, j) + \frac{1}{2} \log_2(M \times N) - 7 + \Delta BD \right) \quad (10)$$

$f_{M \times N, dq}(i,j)$ is a factor for rounding, and may be in the range [0, $$2^{(IQ_{M \times N}(i,j) + \frac{1}{2}\log_2(M \times N) - 7 + \Delta BD)}].$$

For simplicity of exposition herein, the $f_{M \times N, dq}(i,j)$ may be equal to and/or in accordance with $$2^{(IQ_{M \times N}(i,j) + \frac{1}{2}\log_2(M \times N) - 8 + \Delta BD)}.$$

It is contemplated that a value of $$\left( IQ_{M \times N}(i, j) + \frac{1}{2} \log_2(M \times N) - 7 + \Delta BD \right)$$

caller than 0 means left shifting, in which case $f_{M \times N, dq}(i,j)$ may be set to zero.

Inverse Transform

The input to inverse transform may be a dequantized block $Y'_{M \times N}$. To perform a 2-D inverse transform on $Y'_{M \times N}$, the M rows and N columns in $Y'_{M \times N}$ are transformed in a sequential manner, using the horizontal and vertical inverse transforms, respectively. Either horizontal or vertical inverse transform may be performed first. If the horizontal inverse transform is performed first, $Y'_{M \times N}$ may be first right-multiplied by $T_N$ and right shifted with a proper number of bits in order to accommodate 16-bit arithmetic. The resultant intermediate block $V_{M \times N}$ may be as set forth in Equation 11, as follows:

$$V_{M \times N} = (Y'_{M \times N} \times T_N + f_{inv,h}) \gg 8 \quad (11)$$

The factor $f_{inv,h}$ may be in the range [0, 256]. For simplicity of exposition herein, the $f_{inv,h}$ may be equal to 128.

After the horizontal inverse transform, the vertical inverse transform may be performed on the intermediate block $V_{M \times N}$. The process of the vertical inverse transform may be as set forth in Equation 12, as follows:

$$X'_{M \times N} = (T_M^T \times V_{M \times N} + f_{inv,v}) \gg (13 - \Delta BD) \quad (12)$$

where the factor $f_{inv,v}$ may be in the range $[0, 2^{(13-\Delta BD)}]$, and, for simplicity of exposition herein, may be equal to $2^{(12-\Delta BD)}$.

If the vertical inverse transform is performed first, $Y'_{M \times N}$ may be left-multiplied by $T_M^T$ first and right shifted with a proper number of bits in order to accommodate 16-bit arithmetic. The resultant intermediate block $V_{M \times N}$ may be as set forth in Equation 13, as follows:

$$V_{M \times N} = (T_M^T \times Y'_{M \times N} + f_{inv,v}) \gg 8 \quad (13)$$

The factor $f_{inv,v}$ is for rounding, and may be in the range [0, 256]. For simplicity of exposition herein, the $f_{inv,v}$ may be equal to 128.

After the vertical inverse transform, the horizontal inverse transform may be performed on the intermediate block $V_{M \times N}$. The process of horizontal inverse transform may be as set forth in Equation 14, as follows:

$$X'_{M \times N} = (V_{M \times N} \times T_N + f_{inv,h}) \gg (13 - \Delta BD) \quad (14)$$

where the factor $f_{inv,h}$ may be in the range $[0, 2^{(13-\Delta BD)}]$, and, for simplicity of exposition herein, may be equal to $2^{(12-\Delta BD)}$.

Table 1 below summarizes the dynamic range after each step of the operations as disclosed above, assuming the horizontal transform is performed before the vertical transform. As is evident from the table, all of the processes may be implemented using 16-bit arithmetic.

TABLE 1

| Dynamic Range after Various Operations (Horizontal Transform Carried Out First) | |
|---|---|
| Operations | Output Bit-Depth |
| Input $X_{M \times N}$ | 9 + ΔBD |
| Horizontal forward transform $X_{M \times N} \times T_N^T$ | 16 + $\log_2$(N) + ΔBD |
| Right shifting   $\gg(\log_2(N) + \Delta BD)$ | 16 |

TABLE 1-continued

Dynamic Range after Various Operations (Horizontal Transform Carried Out First)

| Operations | | Output Bit-Depth |
|---|---|---|
| Vertical forward transform | $T_M \times U_{MxN}$ | $23 + \log_2(M)$ |
| Right shifting | $>>(\log_2(M) + 7)$ | 16 |
| Quantization by stepsize W | $(Y_{MxN} \times S_{MxN} + f_{MxN,q}) >> \left(Q_{MxN} + 7 - \frac{1}{2}\log_2(M \times N) - \Delta BD\right)$ | $9 + \Delta BD + \frac{1}{2}\log_2(M \times N) - \log_2 W$ |
| Dequantization by stepsize W | $(Z_{MxN} \times D_{MxN} + f_{MxN,dq}) >> \left(\frac{1}{2}\log_2(M \times N) - 7 + IQ_{MxN} + \Delta BD\right)$ | 16 |
| Horizontal inverse transform | $Y'_{MxN} \times T_N$ | 23 |
| Right shifting | $>>8$ | 15 |
| Vertical inverse transform | $T_M^T \times V_{MxN}$ | 22 |
| Right shifting | $>> (13 - \Delta BD)$ | $9 + \Delta BD$ |
| Output | $X'_{MxN}$ | $9 + \Delta BD$ |

Example Encoder

Referring to FIG. 2, in all existing video coding standards, the video block unit consists of 16×16 pixels, commonly referred to as a macroblock (MB). The Joint Collaborative Team on Video Coding JCT-VC is developing the next generation video coding standard called High Efficiency Video Coding (HEVC).

For next generation video coding, extended block sizes (e.g., coding units (CU)) may be used to compress high resolution (1080p and beyond) video signals. A CU may be any size up to 64×64 pixels, and may be further partitioned into prediction units (PUs), for which separate prediction methods may be applied. For each input video block (for example, a MB or a CU), the spatial prediction unit 260 may perform spatial prediction and/or the motion/temporal prediction unit 262 may perform motion prediction. The spatial prediction unit 260 (e.g., for intra prediction) may use pixels from the already coded neighboring blocks in the same video picture/slice to predict the current video block. The spatial prediction unit 260 may reduce spatial redundancy inherent in the video signal. The motion/temporal prediction unit 262 (e.g., for inter prediction and/or motion compensated prediction) may use pixels from the already coded video pictures to predict the current video block. The temporal prediction 262 may reduce temporal redundancy inherent in the video signal. A motion/temporal prediction signal for a given video block may be signaled by one or more motion vectors that may indicate an amount and a direction of motion between the current block and its reference block. If multiple reference pictures are enabled (and/or supported) for each video block (as is the case for the recent video coding standards such as H.264/AVC and/or HEVC), a reference picture index separate or in additional the reference pictures may be sent. The reference index may be used to identify, from which reference picture in the reference picture store 264 the motion/temporal prediction signal comes (e.g., is provided). After spatial prediction and/or motion/temporal prediction, the mode decision and encoder controller unit (MDECU) 280 in the encoder may choose the best prediction mode, for example, based on a rate-distortion optimization method. The prediction block may be subtracted from the current video block at the first adder 216; and the prediction residual may be de-correlated using the transform unit 204 and may be quantized at the quantization unit 206 to achieve a target bit-rate. The quantized residual coefficients may be inverse quantized at inverse quantization unit 210 and inverse transformed at inverse transform unit 212 to form the reconstructed residual, which may be added back to the prediction block at the second adder 226 to form a reconstructed video block.

In-loop filtering including, for example, a deblocking filter and/or adaptive loop filters 266 may be applied on the reconstructed video block before the reconstructed video block is stored in the reference picture store 264 and/or may be used to code future video blocks. The coding mode (inter or intra), the prediction mode information, the motion information, and/or the quantized residual coefficients may be sent (e.g., may all be sent) to the entropy coding unit 208 to be further compressed (and packed) to form the output video bitstream BS 220.

Example Decoder

Referring to FIG. 3, the video bitstream BS 302 may be unpacked and entropy decoded at the entropy decoding unit 308. The coding mode and prediction information may be sent to either the spatial prediction unit 360 (if the entropy decoded bitstream is intra-coded) and/or the temporal/motion prediction 362 (if the entropy decoded bitstream is inter-coded) to form the prediction block. The residual transform coefficients may be sent to the inverse quantization 310 and inverse transform unit 312 to reconstruct the residual block. The prediction block and the residual block may be added together at the adder 326. The reconstructed block may pass (e.g., go through) in-loop filter 366 before being stored in reference picture store 364. The reconstructed video in the reference picture store 364 may be sent out to drive a display device, as well as may be used to predict future video blocks.

Systems and methods for performing transforms, quantization, inverse quantization, and inverse transforms are described herein. Given a video coding system, transform matrices may be pre-defined. In H.261, MPEG-2, and MPEG-4, the transform matrix is a discrete cosine transform (DCT) matrix with a size 8×8. In H.264/AVC, 4×4 and 8×8 transform matrices are used, which are the integer variants of 4×4 and 8×8 DCTs. In HEVC, the ongoing video standardization project, 4×4, 8×8, 16×16, and 32×32 integer transform matrices may be used. In an M×M transform matrix, denoted as $T_M$, each row is a basis vector and $T_M$ has M basis vectors.

The input to transform unit 204 may be a block with size M×N (M rows and N columns), denoted as $X_{M \times N}$. Generally, M and N are 2 to the integer power (e.g., 4, 8, 16, and/or 32). In transform unit 204, $X_{M \times N}$ may be left- and right-multiplied with two transform matrices: $T_M$ and $T_N^T$ (where superscript T denotes matrix transposition), and may be converted to its representation in the transform domain (denoted as $Y_{M \times N}$). Performing either left- or right-multiplication first leads to the same result, as shown in Equation (15).

$$Y_{M \times N} = (T_M \times X_{M \times N}) \times T_N^T = T_M \times (X_{M \times N} \times T_N^T) \quad (15)$$

The left-multiplication projects each column of $X_{M \times M}$ or $(X_{M \times N} \times T_N^T)$ to the basis vectors of $T_M$, and is referred to as a vertical transform. The right-multiplication projects each row of $(T_M \times X_{M \times N})$ or $X_{M \times N}$ to the basis vectors of $T_N$, and is referred to as a horizontal transform.

In certain representative embodiments, procedures for quantization via the quantization unit 206 may include: (1) dividing $Y_{M \times N}(i, j)$ ($0 \leq i < M$, $0 \leq j < N$) by $(T_M(0, 0) \times T_M(0,0) \times \sqrt{MN})$ for normalizing the transform and/or (2) dividing $Y_{M \times N}(i, j)$ by a quantization stepsize $Z_{M \times N}(i, j)$ to achieve a target bit rate. $T_M(0, 0)$ and $T_N(0, 0)$ refer to the top-left elements in $T_M$ and $T_N$, respectively. The output is denoted as $W_{M \times N}(i,j)$.

It is contemplated that the procedures may be combined and implemented by multiplying a scaling factor $S_{M \times N}(i,j)$ and right shifting an appropriate number of bits $Q_{M \times N}(i,j)$. The right shifting of a number by n bits is equivalent to dividing that number by $2^n$. In certain representative embodiments, the values of $S_{M \times N}(i, j)$ and $Q_{M \times N}(i, j)$ may satisfy the approximation as shown in Approximation (16).

$$W_{M \times N}(i, j) = \frac{Y_{M \times N}(i, j) \times S_{M \times N}(i, j)}{2^{Q_{M \times N}(i,j)}} \approx \frac{Y_{M \times N}(i, j)}{T_M(0, 0) \times T_N(0, 0) \times \sqrt{MN} \times Z_{M \times N}(i, j)} \quad (16)$$

H.264/AVC and/or HEVC have 52 pre-defined rational-valued stepsizes, indexed by QP (QP=0, 1 . . . 51) and ranging from 0.63 (QP=0) to 228 (QP=51). The stepsize increases about $2^{1/6}$ times with each increment of QP and doubles (e.g., exactly doubles) for every 6 increments. The stepsize (e.g., denoted as $Z_{M \times N}(QP+6k,i,j)$) with index QP+6k (where k is a positive integer), is $2^k$ times of the stepsize (e.g., denoted as $Z_{M \times N}(QP,i,j)$) with index QP. The dividing procedure to divide $Z_{M \times N}(QP+6k,i,j)$ in Approximation (16) can share the same scaling factor with the dividing procedure to divide $Z_{M \times N}(QP,i,j)$, and may uses k more bits for right shift. With this property, 6 scaling factors (e.g., only 6 scaling factors) are to be define and/or stored, as shown in the second row of Table 2. The 6 scaling factors may be used to represent 52 stepsizes by controlling the number of bits to be right shifted. Stepsize equal to 1 corresponds to QP equal to 4, where scaling factor is $16384 = 2^{14}$ and bits for right shift are 14.

TABLE 2

Scaling factors for quantization and inverse quantization

| QP % 6 | 0 | 1 | 2 | 3 | 4 | 5 |
|---|---|---|---|---|---|---|
| S | 26214 | 23302 | 20560 | 18396 | 16384 | 14564 |
| IS | 40 | 45 | 51 | 57 | 64 | 72 |

In certain representative embodiments, procedures for inverse quantization at inverse quantization unit 210, 310 may include: (1) dividing $W_{M \times N}(i,j)$ by $(T_M(0, 0) \times T_M(0, 0))$ for normalizing the inverse transform in advance and/or (2) multiplying $W_{M \times N}(i,j)$ by the quantization stepsize $Z_{M \times N}(i, j)$.

It is contemplated that to use integer arithmetic, the procedures for inverse quantization (e.g., the division and/or multiplication) may be approximated by multiplying a scaling factor $IS_{M \times N}(i, j)$ and right shifting $IQ_{M \times N}(i, j)$ bits, to get $\tilde{Y}_{M \times N}(i,j)$, as shown in Approximation (17). Similar to quantization, 6 inverse scaling factors (e.g., only six inverse scaling factors) are to be defined and stored, as shown in the third row of Table 2.

$$\tilde{Y}_{M \times N}(i, j) = \frac{W_{M \times N}(i, j) \times IS_{M \times N}(i, j)}{2^{IQ_{M \times N}(i,j)}} \approx \frac{W_{M \times N}(i, j) \times Z_{M \times N}(i, j)}{T_M(0, 0) \times T_N(0, 0) \times \sqrt{MN}} \quad (17)$$

In inverse transform 212 and/or 312, $\tilde{Y}_{M \times N}(i,j)$ may be transformed back to the spatial domain to get the distorted version of $X_{M \times N}$, denoted as $\tilde{X}_{M \times N}$, as shown in Equation (18).

$$\tilde{X}_{M \times N}(i,j) = (T_M^T \times \tilde{Y}_{M \times N}(i,j)) \times T_N = T_M^T \times (\tilde{Y}_{M \times N}(i,j) \times T_N) \quad (18)$$

Example 16-Bit Implementation

In a 16-bit Implementation, the input video generally has a bit-depth equal to 8-bit, and the dynamic range of the pixel values is [0, 255]. Herein, dynamic range is sometimes represented by a number of bits. Some applications, such as higher quality videos, may have larger dynamic range (for example, 10-bit, 12-bit, 14-bit, and/or n-bit, where n is an integer less than the implementation bit value (e.g., the 16-bit implementation)). The input to the transform may be the prediction error, often referred to as the residue, which can have a 50% chance to be negative, and the dynamic range may increase by 1 bit. For example, if the input video has an 8-bit depth, the dynamic range of transform input is [−255, 255], i.e., 9-bits. The dynamic range of the transform input may be denoted as 9+Δbit depth (ΔBD). ΔBD may be greater than zero for higher quality videos. An output dynamic range of each stage is shown in Table 3.

TABLE 3

Output Dynamic Range of Each Stage

| Operations | Output Dynamic Range of Each Stage |
|---|---|
| Input | 9 + ΔBD |
| Horizontal transform | 9 + ΔBD + $\log_2(T_N(0, 0) \times N)$ |
| Vertical transform | 9 + ΔBD + $\log_2(T_M(0, 0) \times M \times T_N(0, 0) \times N)$ |
| Quantization | 9 + ΔBD + $\frac{1}{2}\log_2(M \times N) - \log_2 Z_{M \times N}(i, j)$ |
| Inverse Quantization | 9 + ΔBD − $\log_2(T_M(0, 0) \times T_N(0,0))$ |
| Vertical inverse transform | 9 + ΔBD − $\log_2 T_N(0, 0)$ |
| Horizontal inverse transform | 9 + ΔBD |

For example, one matrix multiplication with $T_M$ in the transform may cause a dynamic range increase by $\log_2(T_M(0, 0) \times M)$ bits. A quantization may cause a dynamic range decrease by $\log_2(T_M(0, 0) \times T_N(0, 0) \times \sqrt{MN} \times Z_{M \times N}(i,j))$ bits (e.g., which is a denominator shown in Approximation (16)). An inverse quantization may cause a dynamic range increase by $$\log_2 \frac{Z_{M \times N}(i, j)}{T_M(0, 0) \times T_N(0, 0) \times \sqrt{MN}}$$

bits (see Approximation (17)). One matrix multiplication with $T_M^T$ in the inverse transform may cause a dynamic range increase by $\log_2 T_M(0, 0)$ bits.

The dynamic range of the input and output of the whole process (e.g., the representative procedure) may be configured to be the same. Factors that may cause dynamic range increases may include the transform, the inverse transform, multiplying $S_{M \times N}(i,j)$ for quantization, and multiplying $IS_{M \times N}(i,j)$ in the inverse quantization. The factors that may cause dynamic range decreases may include right shifting $Q_{M \times N}(i,j)$ bits in the quantization and $IQ_{M \times N}(i,j)$ bits in the inverse quantization. The right shifting of $Q_{M \times N}(i,j)$ and $IQ_{M \times N}(i,j)$ bits may not be put in quantization and inverse quantization, respectively. In certain representative procedures, the shifts (e.g., in either direction) may be distributed (e.g., arbitrarily distributed) in any stages as shown in FIG. 12 and the dynamic range may go back to (e.g., return to) 9+ΔBD at the end of the process, as long as the summation of right shifting bits is equal to $Q_{M \times N}(i,j)+IQ_{M \times N}(i,j)$. To calculate $Q_{M \times N}(i,j)+IQ_{M \times N}(i,j)$, Approximations (16) and (17) may be multiply, as shown in Approximation (19).

$$\frac{Y_{M \times N}(i, j) \times W_{M \times N}(i, j) \times S_{M \times N}(i, j) IS_{M \times N}(i, j)}{2^{Q_{M \times N}(i,j)+IQ_{M \times N}(i,j)}} \approx \qquad (19)$$

$$\frac{Y_{M \times N}(i, j) \times W_{M \times N}(i, j) \times Z_{M \times N}(i, j)}{T_M^2(0, 0) \times T_N^2(0, 0) \times Z_{M \times N}(i, j)}$$

The Approximation (35) may be simplified as shown in Approximation (20).

$$2^{Q_{M \times N}(i,j)+IQ_{M \times N}(i,j)} \approx S_{M \times N}(i,j) \times IS_{M \times N}(i,j) \times T_M^2(0,0) \times T_N^2(0,0) \times MN \qquad (20)$$

Therefore, $Q_{M \times N}(i,j)+IQ_{M \times N}(i,j)$ may be equal to (or approximately equal) to $\log_2(S_{M \times N}(i,j) \times IS_{M \times N}(i,j) \times T_M^2(0, 0) \times T_N^2(0,0) \times MN)$, and may be independent of the quantization stepsize $Z_{M \times N}(i,j)$.

In certain representative embodiments, procedures may determine distribution of right shifts and/or left shifts at one or more stages (or each stage). For example, as set forth above, if $Z_{M \times N}(i,j)$ is equal to 1, the corresponding index QP=4, the scaling factor $S_{M \times N}(i,j)$ is 16384, and the inverse scaling factor $IS_{M \times N}(i,j)$ is 64, which are 14 and 6 bits (e.g., exactly 14 and 6 bits), respectively.

If the output dynamic range of each stage is limited to 16-bits (e.g., all stages are limited to 16-bit), 16-bit hardware may be used to implement the process (e.g., the whole process) and, potentially, at a much lower cost compared with using, for example, 32-bit hardware.

In the HEVC standard, for example, four transform sizes may be used: 4×4, 8×8, 16×16, and 32×32. The transform matrices are denoted as $T_M$ (M=4, 8, 16, and 32). $T_M(0,0)$ is 64. $S_{M \times N}(i,j) \times IS_{M \times N}(i,j)$ is equal to $2^{20}$ (e.g., may always b equal to $2^{20}$) (see Table 2 herein), regardless of QP. Substituting these conditions into Table 3, the theoretical dynamic ranges after each stage may be determined. Based on Approximation (36), the total bits for right shift are 48/50/52/54 for 4×4/8×8/16×16/32×32 transforms, respectively. The same notation pattern A/B/C/D is used in FIG. 12. HEVC has adopted four non-square transforms: M=4, N=16; M=16, N=4; M=8, N=32; M=32, N=8. For brevity, only square transforms (M=N) are discussed, however, one of skill in the art understands that the non-square transforms are similar to square transforms and their procedures are also similar.

When the quantization stepsize $Z_{M \times N}(i,j)$ is equal to 1, FIG. 12 shows how the total bits for right shift may be distributed after each stage in the fourth column, and after the right shift in each step. The output dynamic ranges are indicated by shaded cells. The output of Stage 3 is the transform coefficients to be coded into the bitstream, and the output of Stage 6 is the residual used to reconstruct video. Dynamic ranges associated with Stages 3 and 6 may be configured to be consistent with the theoretical dynamic ranges. The outputs of other stages fit the 16-bit range, controlled by the bits of right shift. It is contemplated that making the output of Stage 5 equal to 15 is conservative, because rounding is taken into consideration.

In certain representative embodiments, transform skip mode procedures and dynamic range control procedures may be implemented. For example, a transform in video coding may be used to remove the correlation among the prediction errors. Because inter prediction in HEVC can be very sophisticated and may result in prediction errors with low energy and little correlation, for example, the correlation may exist (e.g., may only exist) in the horizontal direction or the vertical direction. Three transform skipping modes may be used including: (1) a first mode in which only a horizontal transform may be applied and the vertical transform may be skipped, (2) a second mode in which only a vertical transform is applied and the horizontal transform may be skipped, and (3) a third mode in which transforms in both the horizontal and vertical directions may be skipped, in addition to the normal 2-D transform. For the first, second and third modes, the total bits of right shift may be distributed differently in each stage. The total bits of right shift in each stage for first, second and third modes are shown in FIG. 13, FIG. 14 and FIG. 15, respectively.

To keep the precision of the intermediate data and get good performance, the dynamic range of the data may be made (or set) as large as possible. In a 16-bit implementation, the dynamic range may be maximized and the dynamic range at the end of every stage may be set to 16-bits. The dynamic range control, however, may not be efficient for: (1) the first mode (e.g., the horizontal only transform mode) (see FIG. 13) and (2) the second mode (e.g., the vertical only transform mode (see FIG. 14). In FIG. 13, the output of Stage 3 may have a 15-bit range (only a 15-bit range). In FIG. 14, the outputs of Stages 1 and 3 may have (e.g., may only have) 9+ΔBD and 10+ΔBD ranges, respectively.

Embodiments described herein provide dynamic range control for: (1) the first mode (or horizontal only transform mode) for which horizontal transforms are applied exclusive of vertical transforms; and/or (2) the second mode (or vertical only transform mode) for which horizontal transforms are applied exclusive of vertical transforms. In certain representative embodiments, the first and second modes may enable maximization of the N-bit precision (e.g., for N-bit hardware and simplification of the logic, where N is an integer and, for example may be $2^1$, $2^2$, $2^3$, $2^4$ . . . .

FIG. 16 shows the bits of right shifts after quantization and inverse quantization. The four transform skipping modes shown may share the same $S_{M \times N}(i,j)$ and $IS_{M \times N}(i,j)$ and use different $Q_{M \times N}(i,j)$ and $IQ_{M \times N}(i,j)$ as shown in FIG. 16. The modes (e.g., all of the modes) (e.g., Horizontal & Vertical (H&V), Vertical Only (VO), Horizontal Only (HO) and/or Both Skipped (BS)) may use the same bits of right shift as the H&V mode and may adjust the values of $S_{M \times N}(i,j)$ and $IS_{M \times N}(i,j)$ to meet the appropriate (e.g., correct) bits of right shift. For example, in quantization unit 206, the 4×4 HO mode may be right shifted 20 bits. The $Q_{M\times N}(i,j)$ may be aligned with the 4×4 H&V mode, which is 19. To compensate 1 more bit of right shift, the $S_{M\times N}(i,j)$ may be right shifted 1 bit. For another example, in inverse quantization unit 210, the 16×16 HO mode (e.g., the first mode) may use 2 bits for right shift and the $IQ_{M\times N}(i,j)$ may be equal to 3. The $IS_{M\times N}(i,j)$ may have to be left shifted by 1 bit. The non-integer bits of shift cannot be implemented using integer arithmetic. A look-up table may be defined {128, 181, 256, 362} for 4×4, 8×8, 16×16, and 32×32 transforms, respectively. The numbers in the table may be equal to $\{2^7, 2^{7.5}, 2^8, 2^{8.5}\}$. Applying 1.5 bits of right shift for the quantization of an 8×8 transform, $S_{M\times N}(i,j)$ may be multiplied with 181 and right shifted 9 bits. Applying 2.5 bits of right shift for the quantization of a 32×32 transform, $S_{M\times N}(i,j)$ may be multiplied with 362 and right shifted 11 bits. In certain procedures, a look-up table containing four integers may be stored and/or the quantization and inverse quantization may implement a plurality of right shifts (e.g., right shift twice). The additional or second right shift may cause more precision loss, and may generate less efficient coding (e.g., a penalty for the overall coding efficiency relative to a single right shift).

Described herein are methods, apparatus and systems to solve the non-integer bits of right shift. The quantization stepsizes used for different transform skipping modes may be the same, which may cause the modes using less transforms to have larger quantization errors than modes that use more transforms. To even out the quantization errors for different transform skipping modes, the quantization stepsize may be decreased with the modes of a 2-D transform, a horizontal/vertical only transform, and/or no transform. It is contemplated that the ΔQP may be found or determined using different dimensions of the transform (e.g., finding ΔQP for each of the dimensions of the transform.)

In one representative embodiment, dynamic range control for HO and/or VO transform modes may be provided. One representative dynamic range control process for both HO and/or VO modes, as shown in FIG. 17, may replace the procedures shown in FIG. 13 and/or FIG. 14. Except for the output of the 2nd and 4th stages, having dynamic ranges that are to be consistent with theoretical dynamic ranges, the other outputs after right shifts may have (e.g., may all have) a 16-bit dynamic range.

Certain representative embodiments may provide for non-integer bits of shift. For example, $Q_{M\times N}(i,j)$ and $IQ_{M\times N}(i,j)$ for HO and VO modes are shown in FIG. 16. $Q_{M\times N}(i,j)$ and $IQ_{M\times N}(i,j)$ in both skipped mode are 14 and 6, as shown in FIG. 16. If $Q_{M\times N}(i,j)$ and $IQ_{M\times N}(i,j)$ are integers, the four transform skipping modes may share the same $S_{M\times N}(i,j)$ and $IS_{M\times N}(i,j)$ and may right shift (e.g., directly right shift) their own $Q_{M\times N}(i,j)$ and $IQ_{M\times N}(i,j)$. When $Q_{M\times N}(i,j)$ and $IQ_{M\times N}(i,j)$ are equal to non-integer values (e.g., 19.5, 18.5, 0.5, and 1.5), the operations may be changed as described herein.

As shown in FIG. 18, the rows for S and IS in Table 2 may be circularly shifted with a step of 3 (e.g., entries for index 0 may be moved to entries for index 3, and entries for index 5 may be moved to entries for index 2, among others). As discussed herein, a magnitude difference of neighboring entries (e.g., two neighboring entries) may be $2^{1/6}$ times, and the magnitude difference of entries (e.g., two entries) with a distance of three may be $2^{1/2}$ times. For example, the magnitude of S, of which QP%6 is great than or equal to 3, may be increased $2^{0.5}$ times, whereas the magnitude of S, of which QP%6 is smaller than 3, may be decreased $2^{0.5}$ times. The magnitude of IS, of which QP%6 is greater than or equal to 3, is decreased $2^{0.5}$ times, whereas the magnitude of IS, of which QP%6 is smaller than 3, is increased $2^{0.5}$ times. The result may be that the half-bit shift is done by adjusting S and IS, an integer number of bits left for Q and IQ. If a right shift of X.5 bits is desired for Q and/or IQ, the correct integer number of bits is shown in FIG. 19. The process may re-use the table for scaling factor and may use only one right shift operation for the quantization and inverse quantization.

TABLE 4

Coding gain given transform size and correlation ρ

| | ρ | | | | | | |
|---|---|---|---|---|---|---|---|
| | 0.35 | 0.45 | 0.55 | 0.65 | 0.75 | 0.85 | 0.95 |
| 4 × 4 | 1.0472 | 1.0844 | 1.1395 | 1.2228 | 1.3574 | 1.6118 | 2.3905 |
| 8 × 8 | 1.0556 | 1.0992 | 1.1643 | 1.2635 | 1.4266 | 1.7429 | 2.7621 |
| 16 × 16 | 1.0610 | 1.1085 | 1.1793 | 1.2873 | 1.4655 | 1.8146 | 2.9695 |
| 32 × 32 | 1.0641 | 1.1139 | 1.1879 | 1.3009 | 1.4874 | 1.8540 | 3.0804 |

TABLE 5

ΔQP for using each further (e.g., additional one) dimension of transform, given transform size and correlation ρ

| | ΔQP | | | | | | |
|---|---|---|---|---|---|---|---|
| | 0.35 | 0.45 | 0.55 | 0.65 | 0.75 | 0.85 | 0.95 |
| 4 × 4 | 0 | 1 | 1 | 2 | 3 | 4 | 8 |
| 8 × 8 | 0 | 1 | 1 | 2 | 3 | 5 | 9 |
| 16 × 16 | 1 | 1 | 1 | 2 | 3 | 5 | 9 |
| 32 × 32 | 1 | 1 | 1 | 2 | 3 | 5 | 10 |

In certain representative embodiments, procedures may be implemented for providing adaptive quantization stepsize, for example, for different transform skipping modes. For a 1-D transform case, when using the same QP for the signals with a transform and without the transform, the weight of quantization errors may be measured by coding gain (CG), as shown in Equation (21):

$$CG = \frac{D_S}{D_T} \qquad (21)$$

where $D_S$ is the quantization errors for the signal without a transform and $D_T$ is the quantization errors for the signals with the transform. The subscripts S and T denote the spatial and the transform domain, respectively. A formula or algorithm (e.g., executed via hardware) may be used to calculate CG (e.g., the value of which may depend on the transform size and the correlation ρ of the input signal). Given the transform size and correlation ρ, coding gain may be denoted as CG(size, ρ). Based on that formula, CG(size, ρ) may be calculated. The values are shown in Table 4. To compensate for the larger quantization error caused by one less dimension of transform, a small QP may be used, such that the ratio of the stepsize for the signal with the transform to the stepsize for the signal without the transform is the value shown in Table 4. For example, the decrement of QP may cause a stepsize decreases CG(size,ρ) times, as shown in Equation (22).

$$2^{\frac{\Delta QP}{6}} = CG(\text{size}, \rho) \qquad (22)$$

Based on Equation (22), ΔQP may be calculated as set forth in Equation (39) and its values are shown in Table 5.

$$\Delta QP = \text{round}(\log_2 CG(\text{size}, \rho) \times 6) \qquad (23)$$

Representative systems and methods described herein may be well-suited for video communications involving all types of communication including wired and wireless networks. An overview of various types of wireless devices and infrastructure is provided with respect to FIGS. 4A-4E, where various elements of the network may utilize the systems and methods described herein. For brevity, wireless networks are described, but, as one of skill in the art understands, various embodiments apply equally as well to wired networks, mixed networks (e.g., wired and wireless), and/or ad hac networks, among others. More specifically, base stations such as base transceiver station (BTS), a Node-B, an eNode B, a Home Node B, a Home eNode B, a site controller, an access point (AP), a wireless router, a media aware network element (MANE), including a wireless transmit/receive units (WTRUs) may utilize the methods described herein to convey coded video data from one entity to another.

Figure 4A:
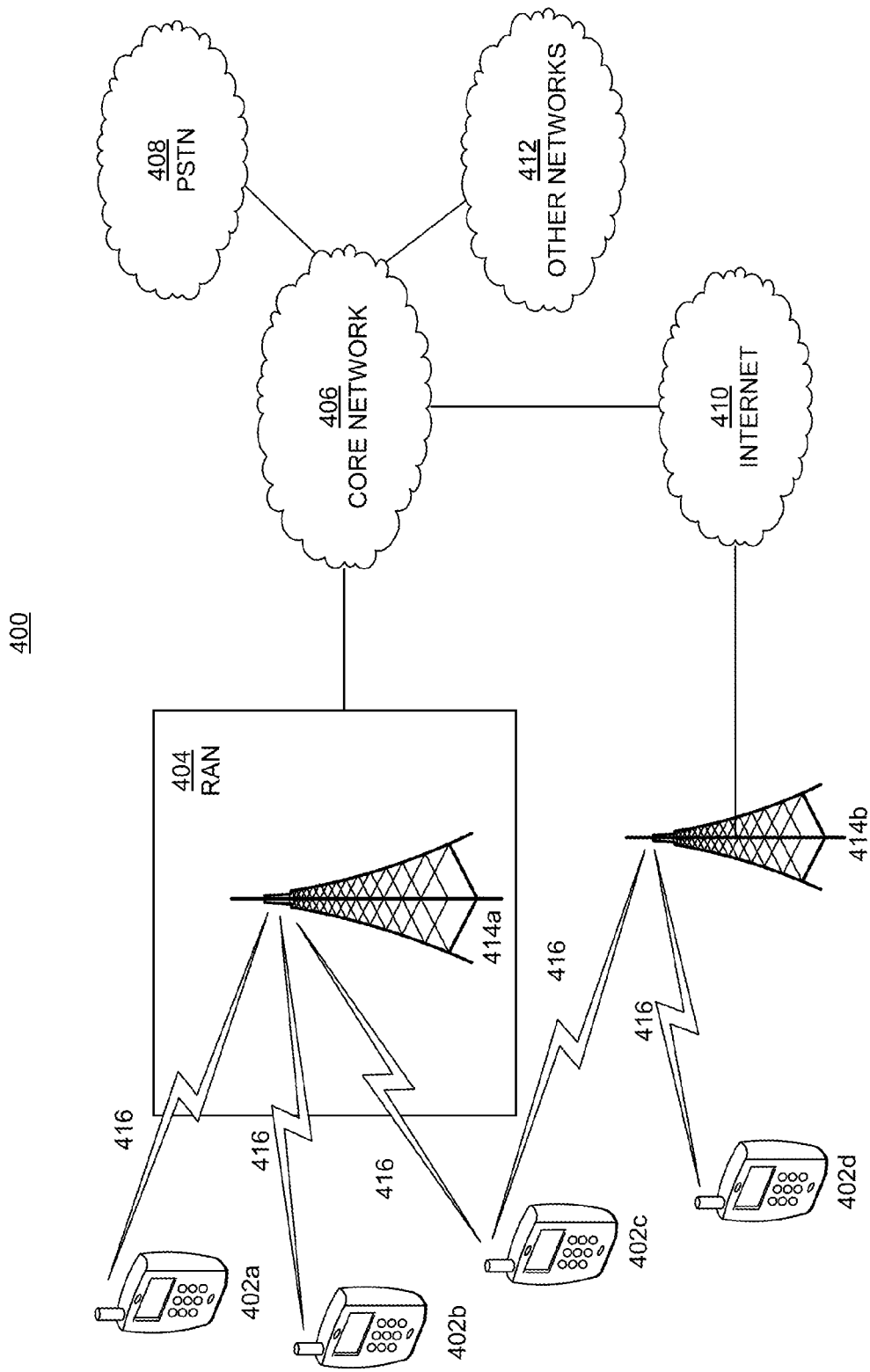
FIG. 4A is a diagram of an example communications system in which one or more disclosed embodiments may be implemented.

FIG. 4A is a diagram of an example communications system 400 in which one or more disclosed embodiments may be implemented. The communications system 400 may be a multiple access system that provides content, such as voice, data, video, messaging, broadcast, etc., to multiple wireless users. The communications system 400 may enable multiple wireless users to access such content through the sharing of system resources, including wireless bandwidth. For example, the communications systems 900 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 4A, the communications system 400 may include wireless transmit/receive units (WTRUs) 402a, 402b, 402c, 402d, a radio access network (RAN) 404, a core network 406, a public switched telephone network (PSTN) 408, the Internet 410, and other networks 412, though it will be appreciated that the disclosed embodiments contemplate any number of WTRUs, base stations, networks, and/or network elements. Each of the WTRUs 402a, 402b, 402c, 402d may be any type of device configured to operate and/or communicate in a wireless environment. By way of example, the WTRUs 402a, 402b, 402c, 402d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, or any other terminal capable of receiving and processing compressed video communications.

The communications systems 400 may also include a base station 414a and a base station 414b. Each of the base stations 414a, 414b may be any type of device configured to wirelessly interface with at least one of the WTRUs 402a, 402b, 402c, 402d to facilitate access to one or more communication networks, such as the core network 406, the Internet 410, and/or the networks 412. By way of example, the base stations 414a, 414b may be a base transceiver station (BTS), a Node-B, an eNode B, a Home Node B, a Home eNode B, a site controller, an access point (AP), a wireless router, and the like. While the base stations 414a, 414b are each depicted as a single element, it will be appreciated that the base stations 414a, 414b may include any number of interconnected base stations and/or network elements.

The base station 414a may be part of the RAN 404, which may also include other base stations and/or network elements (not shown), such as a base station controller (BSC), a radio network controller (RNC), relay nodes, etc. The base station 414a and/or the base station 414b may be configured to transmit and/or receive wireless signals within a particular geographic region, which may be referred to as a cell (not shown). The cell may further be divided into cell sectors. For example, the cell associated with the base station 414a may be divided into three sectors. Thus, in one embodiment, the base station 414a may include three transceivers, i.e., one for each sector of the cell. In another embodiment, the base station 414a may employ multiple-input multiple output (MIMO) technology and, therefore, may utilize multiple transceivers for each sector of the cell.

The base stations 414a, 414b may communicate with one or more of the WTRUs 402a, 402b, 402c, 402d over an air interface 416, which may be any suitable wireless communication link (e.g., radio frequency (RF), microwave, infrared (IR), ultraviolet (UV), visible light, etc.). The air interface 416 may be established using any suitable radio access technology (RAT).

More specifically, as noted above, the communications system 400 may be a multiple access system and may employ one or more channel access schemes, such as CDMA, TDMA, FDMA, OFDMA, SC-FDMA, and the like. For example, the base station 414a in the RAN 404 and the WTRUs 402a, 402b, 402c may implement a radio technology such as Universal Mobile Telecommunications System (UMTS) Terrestrial Radio Access (UTRA), which may establish the air interface 416 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 414a and the WTRUs 402a, 402b, 402c may implement a radio technology such as Evolved UMTS Terrestrial Radio Access (E-UTRA), which may establish the air interface 416 using Long Term Evolution (LTE) and/or LTE-Advanced (LTE-A).

In other embodiments, the base station 414a and the WTRUs 402a, 402b, 402c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 45 (IS-95), Interim Standard 856 (IS-856), Global System for Mobile communications (GSM), Enhanced Data rates for GSM Evolution (EDGE), GSM EDGE (GERAN), and the like.

The base station 414b in FIG. 4A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 414b and the WTRUs 402c, 402d may implement a radio technology such as IEEE 802.11 to establish a wireless local area network (WLAN). In another embodiment, the base station 414b and the WTRUs 402c, 402d may implement a radio technology such as IEEE 802.15 to establish a wireless personal area network (WPAN). In yet another embodiment, the base station 414b and the WTRUs 402c, 402d may utilize a cellular-based RAT (e.g., WCDMA, CDMA2000, GSM, LTE, LTE-A, etc.) to establish a picocell or femtocell. As shown in FIG. 4A, the base station 414*b* may have a direct connection to the Internet 410. Thus, the base station 414*b* may not be required to access the Internet 410 via the core network 406.

The RAN 404 may be in communication with the core network 406, which may be any type of network configured to provide voice, data, applications, and/or voice over internet protocol (VoIP) services to one or more of the WTRUs 402*a*, 402*b*, 402*c*, 402*d*. For example, the core network 406 may provide call control, billing services, mobile location-based services, pre-paid calling, Internet connectivity, video distribution, etc., and/or perform high-level security functions, such as user authentication. Although not shown in FIG. 4A, it will be appreciated that the RAN 404 and/or the core network 406 may be in direct or indirect communication with other RANs that employ the same RAT as the RAN 404 or a different RAT. For example, in addition to being connected to the RAN 404, which may be utilizing an E-UTRA radio technology, the core network 406 may also be in communication with another RAN (not shown) employing a GSM radio technology.

The core network 406 may also serve as a gateway for the WTRUs 402*a*, 402*b*, 402*c*, 402*d* to access the PSTN 408, the Internet 410, and/or other networks 412. The PSTN 408 may include circuit-switched telephone networks that provide plain old telephone service (POTS). The Internet 410 may include a global system of interconnected computer networks and devices that use common communication protocols, such as the transmission control protocol (TCP), user datagram protocol (UDP) and the internet protocol (IP) in the TCP/IP internet protocol suite. The networks 412 may include wired or wireless communications networks owned and/or operated by other service providers. For example, the networks 412 may include another core network connected to one or more RANs, which may employ the same RAT as the RAN 404 or a different RAT.

Some or all of the WTRUs 402*a*, 402*b*, 402*c*, 402*d* in the communications system 400 may include multi-mode capabilities, i.e., the WTRUs 402*a*, 402*b*, 402*c*, 402*d* may include multiple transceivers for communicating with different wireless networks over different wireless links. For example, the WTRU 402*c* shown in FIG. 4A may be configured to communicate with the base station 414*a*, which may employ a cellular-based radio technology, and with the base station 414*b*, which may employ an IEEE 802 radio technology.

Figure 4B:
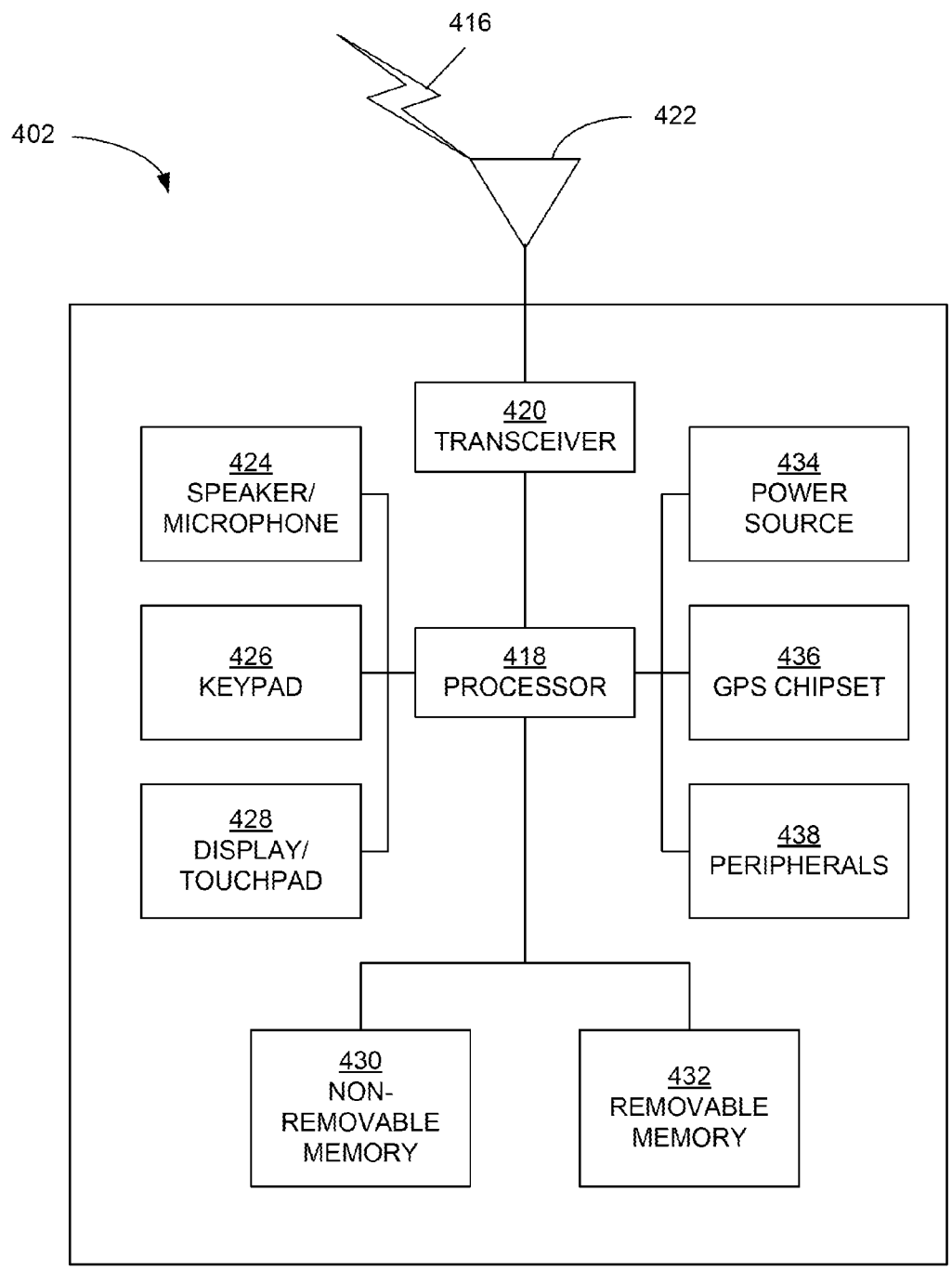
FIG. 4B is a diagram of an example wireless transmit/receive unit (WTRU) that may be used within the communications system illustrated in FIG. 4A.

FIG. 4B is a system diagram of an example WTRU 402. As shown in FIG. 4B, the WTRU 402 may include a processor 418, a transceiver 420, a transmit/receive element 422, a speaker/microphone 424, a keypad 426, a display/touchpad 428, non-removable memory 430, removable memory 432, a power source 434, a global positioning system (GPS) chipset 436, and other peripherals 438. It will be appreciated that the WTRU 402 may include any sub-combination of the foregoing elements while remaining consistent with an embodiment.

The processor 418 may be a general purpose processor, a special purpose processor, a conventional processor, a digital signal processor (DSP), a graphics processing unit (GPU), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 418 may perform signal coding, data processing, power control, input/output processing, and/or any other functionality that enables the WTRU 402 to operate in a wireless environment. The processor 418 may be coupled to the transceiver 420, which may be coupled to the transmit/receive element 422. While FIG. 4B depicts the processor 418 and the transceiver 420 as separate components, it will be appreciated that the processor 418 and the transceiver 420 may be integrated together in an electronic package or chip.

The transmit/receive element 422 may be configured to transmit signals to, or receive signals from, a base station (e.g., the base station 414*a*) over the air interface 416. For example, in one embodiment, the transmit/receive element 422 may be an antenna configured to transmit and/or receive RF signals. In another embodiment, the transmit/receive element 422 may be an emitter/detector configured to transmit and/or receive IR, UV, or visible light signals, for example. In yet another embodiment, the transmit/receive element 422 may be configured to transmit and receive both RF and light signals. It will be appreciated that the transmit/receive element 422 may be configured to transmit and/or receive any combination of wireless signals.

In addition, although the transmit/receive element 422 is depicted in FIG. 4B as a single element, the WTRU 402 may include any number of transmit/receive elements 422. More specifically, the WTRU 402 may employ MIMO technology. Thus, in one embodiment, the WTRU 402 may include two or more transmit/receive elements 422 (e.g., multiple antennas) for transmitting and receiving wireless signals over the air interface 416.

The transceiver 420 may be configured to modulate the signals that are to be transmitted by the transmit/receive element 422 and to demodulate the signals that are received by the transmit/receive element 422. As noted above, the WTRU 402 may have multi-mode capabilities. Thus, the transceiver 420 may include multiple transceivers for enabling the WTRU 402 to communicate via multiple RATs, such as UTRA and IEEE 802.11, for example.

The processor 418 of the WTRU 402 may be coupled to, and may receive user input data from, the speaker/microphone 424, the keypad 426, and/or the display/touchpad 428 (e.g., a liquid crystal display (LCD) display unit or organic light-emitting diode (OLED) display unit). The processor 418 may also output user data to the speaker/microphone 424, the keypad 426, and/or the display/touchpad 428. In addition, the processor 418 may access information from, and store data in, any type of suitable memory, such as the non-removable memory 430 and/or the removable memory 432. The non-removable memory 430 may include random-access memory (RAM), read-only memory (ROM), a hard disk, or any other type of memory storage device. The removable memory 432 may include a subscriber identity module (SIM) card, a memory stick, a secure digital (SD) memory card, and the like. In other embodiments, the processor 418 may access information from, and store data in, memory that is not physically located on the WTRU 402, such as on a server or a home computer (not shown).

The processor 418 may receive power from the power source 434, and may be configured to distribute and/or control the power to the other components in the WTRU 402. The power source 434 may be any suitable device for powering the WTRU 402. For example, the power source 434 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 418 may also be coupled to the GPS chipset 436, which may be configured to provide location information (e.g., longitude and latitude) regarding the current location of the WTRU 402. In addition to, or in lieu of, the information from the GPS chipset 436, the WTRU 402 may receive location information over the air interface 416 from a base station (e.g., base stations 414a, 414b) and/or determine its location based on the timing of the signals being received from two or more nearby base stations. It will be appreciated that the WTRU 402 may acquire location information by way of any suitable location-determination method while remaining consistent with an embodiment.

The processor 418 may further be coupled to other peripherals 438, which may include one or more software and/or hardware modules that provide additional features, functionality, and/or wired or wireless connectivity. For example, the peripherals 438 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 4C:
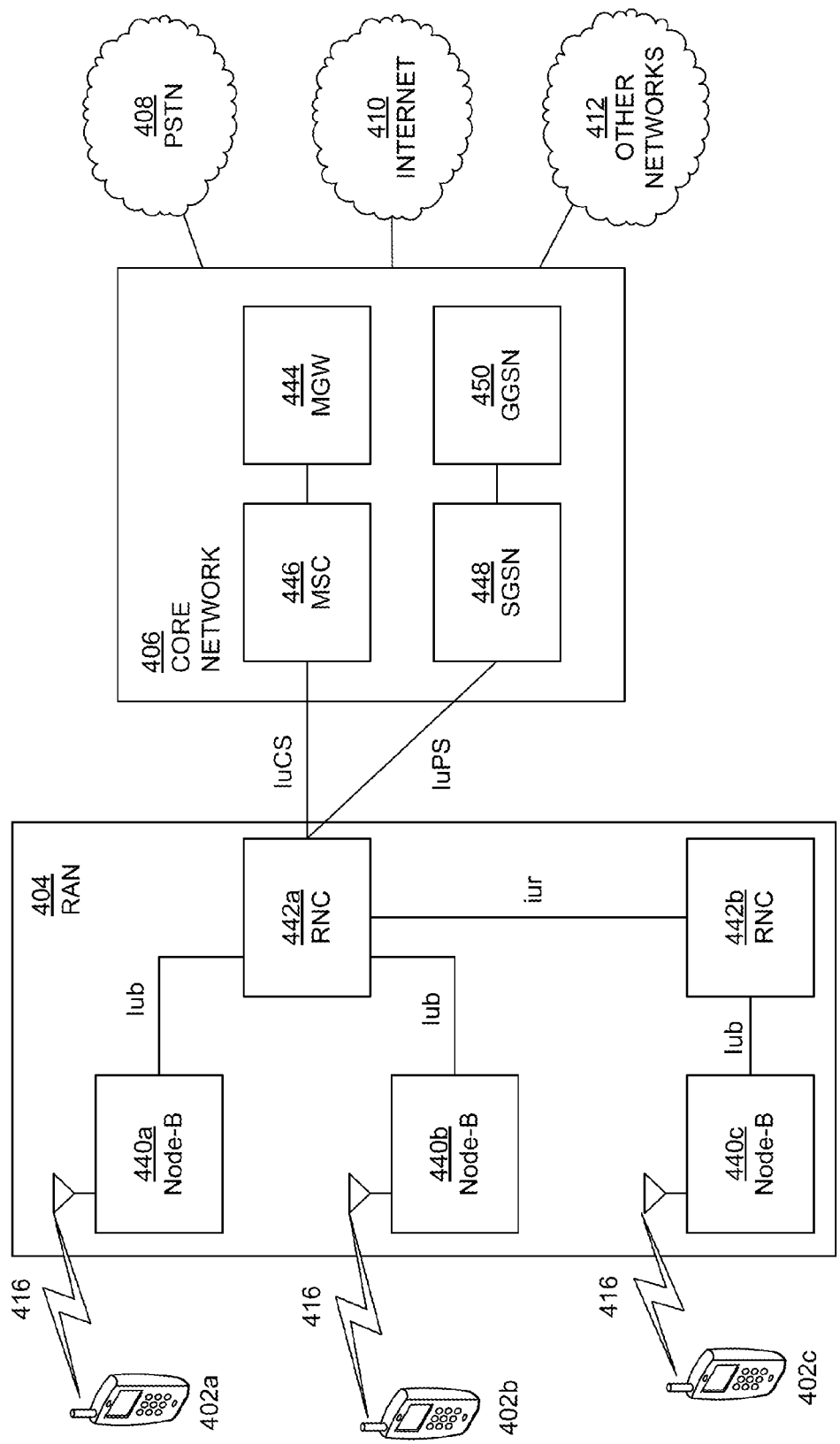
FIGS. 4C, 4D, and 4E are diagrams of example radio access networks and example core networks that may be used within the communications system illustrated in FIG. 4A.

FIG. 4C is a system diagram of the RAN 404 and the core network 406 according to an embodiment. As noted above, the RAN 404 may employ a UTRA radio technology to communicate with the WTRUs 402a, 402b, 402c over the air interface 416. The RAN 404 may also be in communication with the core network 406. As shown in FIG. 4C, the RAN 404 may include Node-Bs 440a, 440b, 440c, which may each include one or more transceivers for communicating with the WTRUs 402a, 402b, 402c over the air interface 416. The Node-Bs 440a, 440b, 440c may each be associated with a particular cell (not shown) within the RAN 404. The RAN 404 may also include RNCs 442a, 442b. It will be appreciated that the RAN 404 may include any number of Node-Bs and RNCs while remaining consistent with an embodiment.

As shown in FIG. 4C, the Node-Bs 440a, 440b may be in communication with the RNC 442a. Additionally, the Node-B 440c may be in communication with the RNC 442b. The Node-Bs 440a, 440b, 440c may communicate with the respective RNCs 442a, 442b via an Iub interface. The RNCs 442a, 442b may be in communication with one another via an Iur interface. Each of the RNCs 442a, 442b may be configured to control the respective Node-Bs 440a, 440b, 440c to which it is connected. In addition, each of the RNCs 442a, 442b may be configured to carry out or support other functionality, such as outer loop power control, load control, admission control, packet scheduling, handover control, macrodiversity, security functions, data encryption, and the like.

The core network 406 shown in FIG. 4C may include a media gateway (MGW) 444, a mobile switching center (MSC) 446, a serving GPRS support node (SGSN) 448, and/or a gateway GPRS support node (GGSN) 450. While each of the foregoing elements are depicted as part of the core network 406, it will be appreciated that any one of these elements may be owned and/or operated by an entity other than the core network operator.

The RNC 442a in the RAN 404 may be connected to the MSC 446 in the core network 406 via an IuCS interface. The MSC 446 may be connected to the MGW 444. The MSC 446 and the MGW 444 may provide the WTRUs 402a, 402b, 402c with access to circuit-switched networks, such as the PSTN 408, to facilitate communications between the WTRUs 402a, 402b, 402c and traditional land-line communications devices.

The RNC 442a in the RAN 404 may also be connected to the SGSN 448 in the core network 406 via an IuPS interface. The SGSN 448 may be connected to the GGSN 450. The SGSN 448 and the GGSN 450 may provide the WTRUs 402a, 402b, 402c with access to packet-switched networks, such as the Internet 410, to facilitate communications between and the WTRUs 402a, 402b, 402c and IP-enabled devices.

As noted above, the core network 406 may also be connected to the networks 412, which may include other wired or wireless networks that are owned and/or operated by other service providers.

Figure 4D:
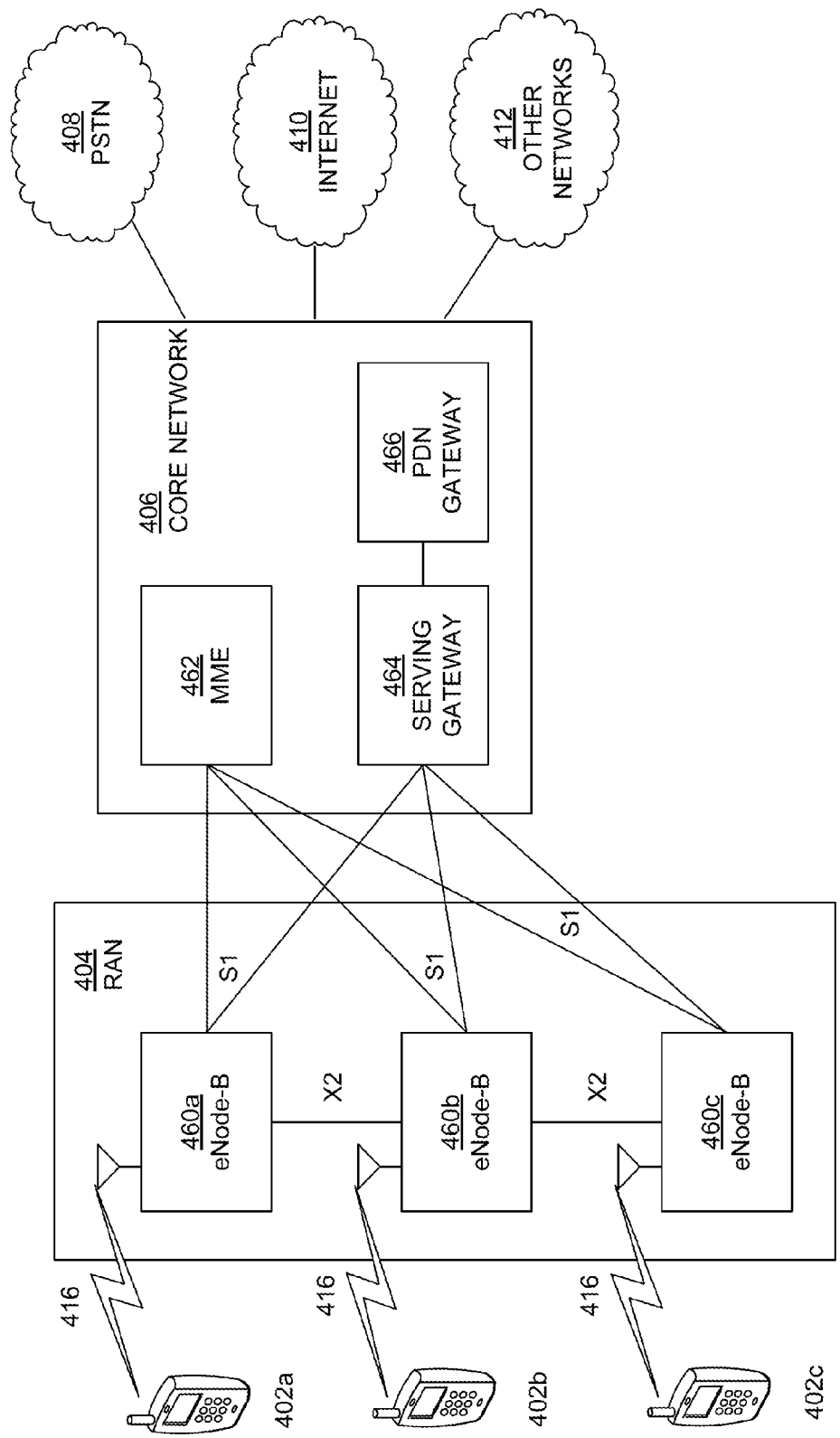

FIG. 4D is a system diagram of the RAN 404 and the core network 406 according to another embodiment. As noted above, the RAN 404 may employ an E-UTRA radio technology to communicate with the WTRUs 402a, 402b, 402c over the air interface 416. The RAN 404 may also be in communication with the core network 406.

The RAN 404 may include eNode-Bs 460a, 460b, 460c, though it will be appreciated that the RAN 404 may include any number of eNode-Bs while remaining consistent with an embodiment. The eNode-Bs 460a, 460b, 460c may each include one or more transceivers for communicating with the WTRUs 402a, 402b, 402c over the air interface 416. In one embodiment, the eNode-Bs 460a, 460b, 460c may implement MIMO technology. Thus, the eNode-B 460a, for example, may use multiple antennas to transmit wireless signals to, and receive wireless signals from, the WTRU 402a.

Each of the eNode-Bs 460a, 460b, 460c may be associated with a particular cell (not shown) and may be configured to handle radio resource management decisions, handover decisions, scheduling of users in the uplink and/or downlink, and the like. As shown in FIG. 4D, the eNode-Bs 460a, 460b, 460c may communicate with one another over an X2 interface.

The core network 406 shown in FIG. 4D may include a mobility management gateway (MME) 462, a serving gateway 464, and a packet data network (PDN) gateway 466. While each of the foregoing elements are depicted as part of the core network 406, it will be appreciated that any one of these elements may be owned and/or operated by an entity other than the core network operator.

The MME 462 may be connected to each of the eNode-Bs 460a, 460b, 460c in the RAN 404 via an S1 interface and may serve as a control node. For example, the MME 462 may be responsible for authenticating users of the WTRUs 402a, 402b, 402c, bearer activation/deactivation, selecting a particular serving gateway during an initial attach of the WTRUs 402a, 402b, 402c, and the like. The MME 462 may also provide a control plane function for switching between the RAN 404 and other RANs (not shown) that employ other radio technologies, such as GSM or WCDMA.

The serving gateway 464 may be connected to each of the eNode Bs 460a, 460b, 460c in the RAN 404 via the S1 interface. The serving gateway 464 may generally route and forward user data packets to/from the WTRUs 402a, 402b, 402c. The serving gateway 464 may also perform other functions, such as anchoring user planes during inter-eNode B handovers, triggering paging when downlink data is available for the WTRUs 402a, 402b, 402c, managing and storing contexts of the WTRUs 402a, 402b, 402c, and the like.

The serving gateway 464 may also be connected to the PDN gateway 466, which may provide the WTRUs 402a, 402b, 402c with access to packet-switched networks, such as the Internet 410, to facilitate communications between the WTRUs 402a, 402b, 402c and IP-enabled devices.

The core network 406 may facilitate communications with other networks. For example, the core network 406 may provide the WTRUs 402a, 402b, 402c with access to circuit-switched networks, such as the PSTN 408, to facilitate communications between the WTRUs 402a, 402b, 402c and traditional land-line communications devices. For example, the core network 406 may include, or may communicate with, an IP gateway (e.g., an IP multimedia subsystem (IMS) server) that serves as an interface between the core network 406 and the PSTN 408. In addition, the core network 406 may provide the WTRUs 402a, 402b, 402c with access to the networks 412, which may include other wired or wireless networks that are owned and/or operated by other service providers.

Figure 4E:
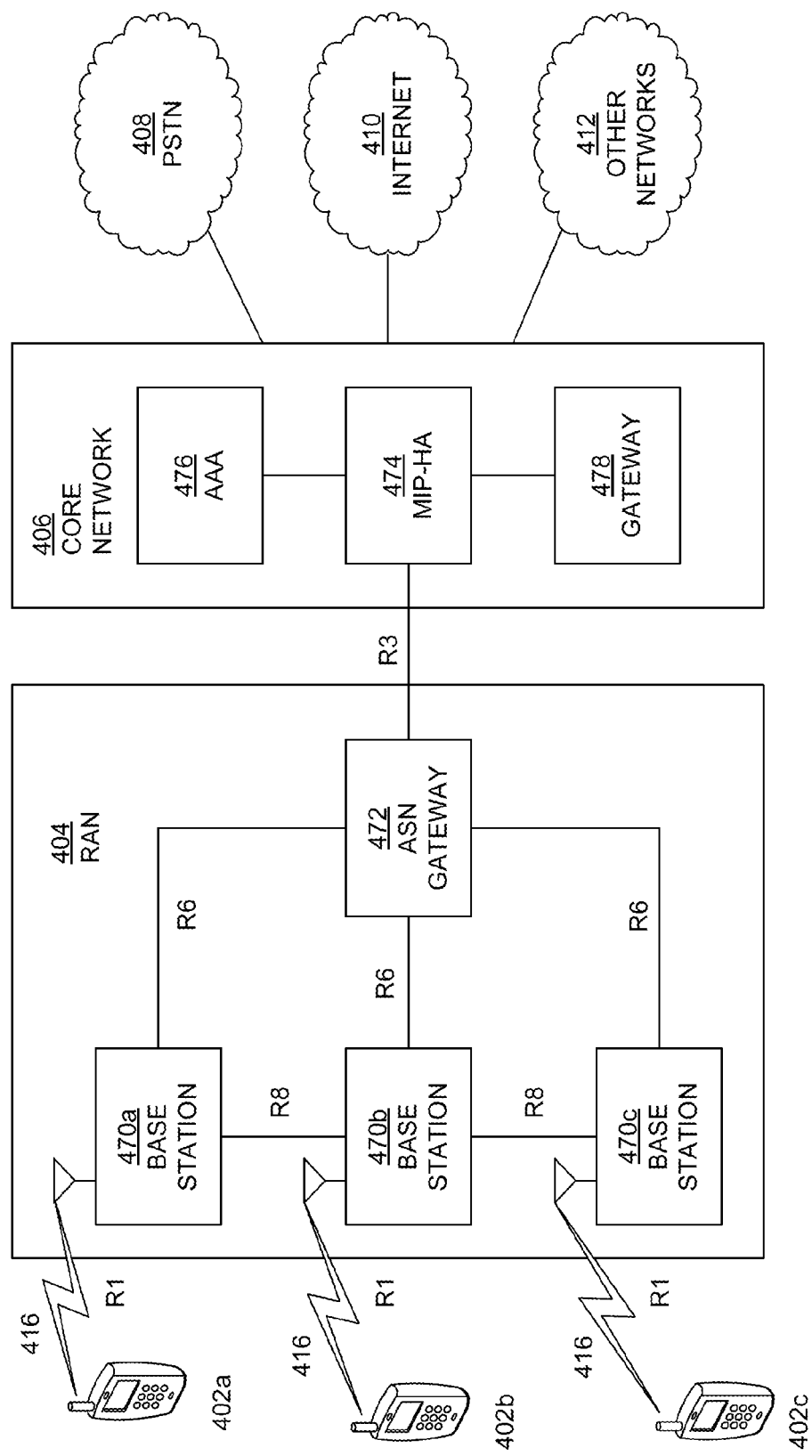

FIG. 4E is a system diagram of the RAN 404 and the core network 406 according to another embodiment. The RAN 404 may be an access service network (ASN) that employs IEEE 802.16 radio technology to communicate with the WTRUs 402a, 402b, 402c over the air interface 416. As will be further discussed below, the communication links between the different functional entities of the WTRUs 402a, 402b, 402c, the RAN 404, and the core network 406 may be defined as reference points.

As shown in FIG. 4E, the RAN 404 may include base stations 470a, 470b, 470c, and an ASN gateway 472, though it will be appreciated that the RAN 404 may include any number of base stations and ASN gateways while remaining consistent with an embodiment. The base stations 470a, 470b, 470c may each be associated with a particular cell (not shown) in the RAN 404 and may each include one or more transceivers for communicating with the WTRUs 402a, 402b, 402c over the air interface 416. In one embodiment, the base stations 470a, 470b, 470c may implement MIMO technology. Thus, the base station 470a, for example, may use multiple antennas to transmit wireless signals to, and receive wireless signals from, the WTRU 402a. The base stations 470a, 470b, 470c may also provide mobility management functions, such as handoff triggering, tunnel establishment, radio resource management, traffic classification, quality of service (QoS) policy enforcement, and the like. The ASN gateway 472 may serve as a traffic aggregation point and may be responsible for paging, caching of subscriber profiles, routing to the core network 406, and the like.

The air interface 416 between the WTRUs 402a, 402b, 402c and the RAN 404 may be defined as an R1 reference point that implements the IEEE 802.16 specification. In addition, each of the WTRUs 402a, 402b, 402c may establish a logical interface (not shown) with the core network 406. The logical interface between the WTRUs 402a, 402b, 402c and the core network 406 may be defined as an R2 reference point, which may be used for authentication, authorization, IP host configuration management, and/or mobility management.

The communication link between each of the base stations 470a, 470b, 470c may be defined as an R8 reference point that includes protocols for facilitating WTRU handovers and the transfer of data between base stations. The communication link between the base stations 470a, 470b, 470c and the ASN gateway 472 may be defined as an R6 reference point. The R6 reference point may include protocols for facilitating mobility management based on mobility events associated with each of the WTRUs 402a, 402b, 402c.

As shown in FIG. 4E, the RAN 404 may be connected to the core network 406. The communication link between the RAN 104 and the core network 406 may defined as an R3 reference point that includes protocols for facilitating data transfer and mobility management capabilities, for example. The core network 406 may include a mobile IP home agent (MIP-HA) 474, an authentication, authorization, accounting (AAA) server 476, and a gateway 478. While each of the foregoing elements are depicted as part of the core network 406, it will be appreciated that any one of these elements may be owned and/or operated by an entity other than the core network operator.

The MIP-HA 474 may be responsible for IP address management, and may enable the WTRUs 402a, 402b, 402c to roam between different ASNs and/or different core networks. The MIP-HA 474 may provide the WTRUs 402a, 402b, 402c with access to packet-switched networks, such as the Internet 410, to facilitate communications between the WTRUs 402a, 402b, 402c and IP-enabled devices. The AAA server 476 may be responsible for user authentication and for supporting user services. The gateway 478 may facilitate interworking with other networks. For example, the gateway 478 may provide the WTRUs 402a, 402b, 402c with access to circuit-switched networks, such as the PSTN 408, to facilitate communications between the WTRUs 402a, 402b, 402c and traditional land-line communications devices. In addition, the gateway 478 may provide the WTRUs 402a, 402b, 402c with access to the networks 412, which may include other wired or wireless networks that are owned and/or operated by other service providers.

Although not shown in FIG. 4E, it will be appreciated that the RAN 404 may be connected to other ASNs and the core network 406 may be connected to other core networks. The communication link between the RAN 404 the other ASNs may be defined as an R4 reference point, which may include protocols for coordinating the mobility of the WTRUs 402a, 402b, 402c between the RAN 404 and the other ASNs. The communication link between the core network 406 and the other core networks may be defined as an R5 reference, which may include protocols for facilitating interworking between home core networks and visited core networks.

Figure 5:
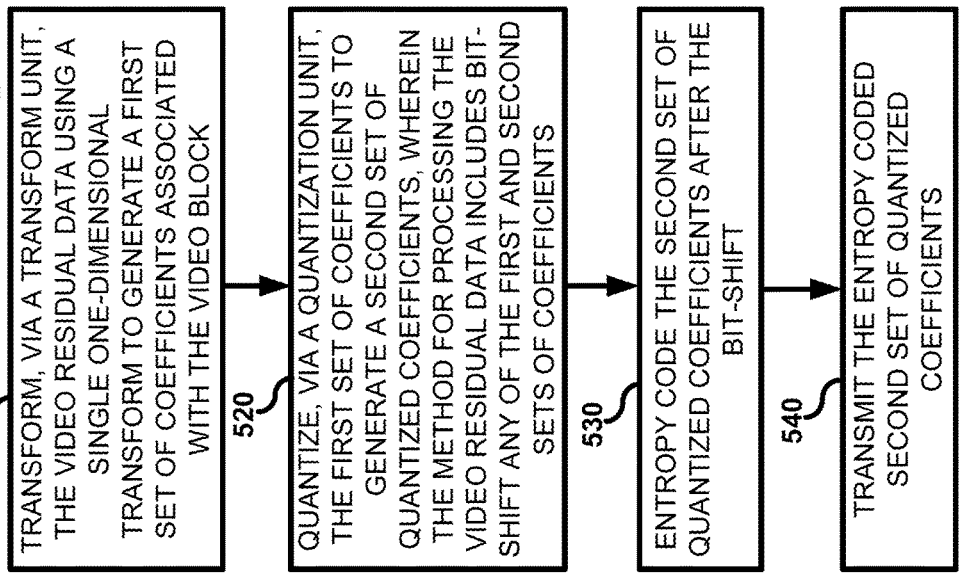
FIG. 5 is a flow chart illustrating a representative method for processing video residual data.

FIG. 5 is a flow chart illustrating a representative method 500 for processing video residual data.

Referring to FIG. 5, the representative method 500 may include, at block 510, a transform unit 204 that may transform the video residual data using a single one-dimensional transform to generate a first set of coefficients associated with the video block and, at block 520, a quantization unit 206 that may quantize the first set of coefficients to generate a second set of quantized coefficients. At block 530, the entropy coding unit 208 may entropy code the second set of quantized coefficients. The bit shifting may occur before the entropy coding by the entropy coding unit 208. For example, the bit shifting may occur in or after any of the transformation in the transform unit 204 or the quantization in the quantization unit 206. At block 540, the transmit/receive unit, for example Tx/Rx unit 120 may transmit the entropy coded second set of quantized coefficients.

In certain representative embodiments, the processing of the video residual data may include bit shifting any of the first and second sets of coefficients and the bit shifting may be an integer number of shifts and/or a fractional number of shifts in either direction (e.g., right and/or left shifts for any stage in the processing). The shifting may be generated by a general-purpose processor (for example, system controller 136) or may use a shift compensation unit (not shown), for example, to shift bits of coefficients (e.g., sets of coefficients). Integer bit shifts may be implemented by direct bit shifting while fractional bit shifts may be implemented using adjustments to the scale factors and inverse scale factors used in the quantization unit 206 and inverse quantization unit 210, respectively.

In certain representative embodiments, the inverse quantization unit 210 may dequantize the second set of coefficients to generate a third set of dequantized coefficients.

In certain representative embodiments, the inverse transform unit 212 may detransform the third set of dequantized coefficients using a single one-dimensional inverse transform, as a detransformed output for generating the video residual data.

In certain representative embodiments, any of the first, second and third sets of coefficients or the detransformed output may be bit shifted.

In certain representative embodiments, the single one-dimensional transform may be a horizontal or vertical transform (e.g., a forward horizontal transform or a forward vertical transform).

In certain representative embodiments, the processing of the video residual data may be implemented in a plurality of units or stages including at least the transform unit 204 (or stage) and/or the quantization unit 206 (or stage) such that bit shifting (e.g., right bit shifting) may occur in or after one or more of the plurality of units (or stages).

In certain representative embodiments, an identical dynamic range of a reconstructed video block reconstructed from the transmitted, entropy coded second set of quantized coefficients relative to the video block used in the processing may be maintained, for example, by adjusting the dynamic range in or after each of the plurality of units or stages.

In certain representative embodiments, the processing of the video block may include only N-bit processing, where N is and integer such as 16, 32 or 64-bit processing, among others.

In certain representative embodiments, a set of scale factors established in accordance with the HEVC standard may be determined, adjusted and/or predefined to bit shift the second set of quantized coefficients by a fraction of a bit, for example, by one-half bit and the quantization unit 206 may apply the determined, adjusted and/or predefined set of scale factors. In other representative embodiments, an additional set of scale factors may be implemented immediately after the quantization unit 206

In certain representative embodiments, the bit shifting may include half-bit shifting during the quantizing process using a set of scale factors associated with the HEVC standard that are cyclically shifted.

In certain representative embodiments, the fractional shifting (e.g., half-bit shifting) may be applied (e.g., only applied) when the transforming uses the single one-dimensional order-$2^N$ transform, where N is an odd numbered integer.

In certain representative embodiments, the bit shifting may include determining a number of right or left bit shifts (e.g., in total and/or per stage) in accordance with a transform size and a type of transform (e.g., vertical, horizontal, and/or diagonal, among others); and applying the determined bit shifts. For example, the number of right bit shifts may increase with the size of the transform.

In certain representative embodiments, the single one-dimensional inverse transform may be a horizontal inverse transform or a vertical inverse transform, among others.

In certain representative embodiments, the processing of the video residual data may be implemented in a plurality of units (or stages) and the bit shifting (e.g., right or left bit shifting) may occur in or after one or more of the plurality of units (or stages).

In certain representative embodiments, an identical dynamic range of a reconstructed video block reconstructed from the transmitted, entropy coded second set of quantized coefficients relative to the video block used in the processing may be maintained by adjusting the dynamic range in or after each of the plurality of units (or stages).

In certain representative embodiments, the inverse quantization unit 210 may determine, adjust and/or have predefined a set of inverse scale factors established in accordance with an HEVC standard to bit shift the third set of dequantized coefficients by one-half bit and may apply the determined, adjusted, or predefined set of inverse scale factors.

In certain representative embodiments, the bit shifting may include half or fractional bit shifting during the dequantizing using a set of inverse scale factors associated with an HEVC standard that are cyclically shifted.

In certain representative embodiments, the quantization unit 206 may selectively adjust or predefine a set of scale factors and the inverse quantization unit 210 may selectively adjust or predefine set of inverse scale factors (e.g., each originally established in accordance with the HEVC standard) based on a transform size to bit shift the second set of quantized coefficients by one-half bit. The quantization unit 206 and the inverse quantization unit 210 may apply the selectively adjusted or predefined sets.

In certain representative embodiments, the bit shifting may include fractional or half-bit shifting in and/or immediately after neither of or both of the quantization unit 206 and in and/or immediately after the inverse quantization unit 210 based on transform size (e.g., 8×8 or 32×32 transform size, among others).

Figure 6:
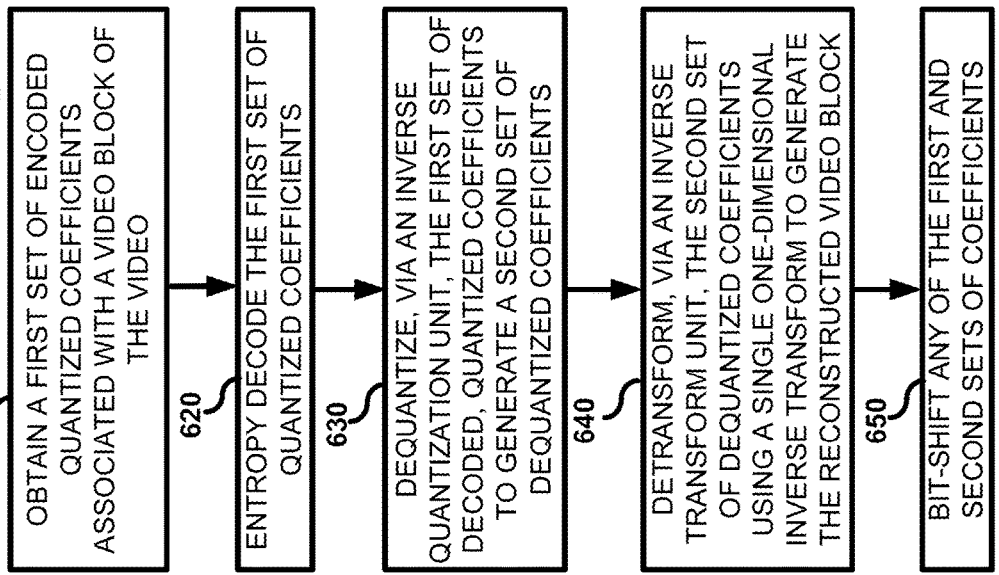
FIG. 6 is a flow chart illustrating a representative method for processing video.

FIG. 6 is a flow chart illustrating a representative method 600 for processing video.

Referring to FIG. 6, the representative method 600 may include, at block 610, the transmit/receive unit (for example, Tx/Rx unit 128) obtaining a first set of encoded quantized coefficients associated with a video block of the video and, at block 620, the entropy decoding unit 308 entropy decoding the first set of quantized coefficients. At block 630, the inverse quantization unit 310 may dequantize the first set of decoded, quantized coefficients to generate a second set of dequantized coefficients. At block 640, the inverse transform unit 312 may detransform the second set of dequantized coefficients using a single one-dimensional inverse transform to generate the reconstructed video block.

As one of skill understands, the decoding process associated with the representative method 600 may reconstruct video (video blocks) associated with the entropy encoded signal generated by the representative method 500 (and may be a reversal of the representative method 500). At block 650, a processor and/or a shift compensation unit may bit shift any of the first and second sets of coefficients. One of skill also understands that some or all of the representative embodiments are equally applicable to both the encoder 200 and decoder 300.

In certain representative embodiments, the bit shifting by the encoder 200 or the decoder 300 may include determining a number of bit shifts (e.g., right and/or left bit shifts (in total and/or per stage)) in accordance with a transform size and a type of transform (e.g., vertical, horizontal, and/or diagonal, among others), and applying the determined bit shifts (e.g., integer and/or fractional bit shifts).

In certain representative embodiments, the inverse quantization unit 310 may determine, adjust and/or have predefined a set of inverse scale factors established in accordance with the HEVC standard to bit shift the second set of dequantized coefficients by a fractional bit or one-half bit; and may selectively apply the determined, adjusted and/or predefined sets based on the transform size (e.g., 8×8 or 32×32, among others).

In certain representative embodiments, the bit shifting may include selectively applying fractional or half-bit shifting in or immediately after the inverse quantization unit 310 based on transform size.

FIG. 7 is a flow chart illustrating another representative method 700 for processing video residual data.

Referring to FIG. 7, the other representative method 700 may include, at block 710, the quantization unit 206 that may quantize the video residual data exclusive of any transformation of the video residual data to generate quantized video residual data, as an output result of a first one of the stages. At block 720, the inverse quantization unit 210 may dequantize the quantized video residual data to generate reconstructed video residual data, as an output result of a second one of the stages. At block 730, in and/or after one or more of the stages, the output result thereof may be bit shifted.

FIG. 8 is a flow chart illustrating a further representative method 800 for processing video.

Referring to FIG. 8, the further representative method 800 may include at block 810, the transmit/receive unit 128 obtaining a first set of encoded quantized coefficients associated with a video block of the video. At block 820, an entropy decoding unit 308 entropy decoding the first set of quantized coefficients. At block 830, the inverse quantization unit 310 dequantizing the first set of decoded, quantized coefficients to generate a second set of dequantized coefficients. At block 840, the inverse transform unit 312 detransforming the second set of dequantized coefficients using a single one-dimensional inverse transform. At block 850, the inverse quantization unit 310, a processor and/or a shift compensation unit may bit shift (e.g., integer and/or fractional bit shifting) any of the first and second sets of coefficients.

FIG. 9 is a flow chart illustrating an additional representative method 900 for processing a video.

Referring to FIG. 9, the additional representative method 900 may include, at block 910, the transmit/receive unit 120 obtaining a video block of the video. At block 920, the transform unit 204 may transform a video residual data using a single one-dimensional transform to generate a set of coefficients associated with the video block, as an output result of a first one of the stages. At block 930, the quantization unit 206 may quantize the set of transformed coefficients to generate a set of quantized coefficients, as an output result of a second one of the stages. At block 940, the inverse quantization unit 210 may dequantize the set of quantized coefficients to generate a set of dequantized, transformed coefficients, as an output result of a third one of the stages. At block 950, the inverse transform unit 212 may detransform, the set of dequantized, transformed coefficients, as an output result of a fourth one of the stages, using a single one-dimensional inverse transform for generating the video residual data. At block 950, the quantization unit 206, the inverse quantization unit 210, a processor and/or a shift compensation unit may bit shift (e.g., integer and/or fractional bit shifting) any of the sets of coefficients.

In certain representative embodiments, the quantizing may include the quantization unit 206 selecting or determining a quantization parameter as a function of a number of dimensions of the transform used in the processing of the video block, and applying the quantization parameter to generate the output result of the quantizing.

In certain representative embodiments, the dequantizing may include, for example, the inverse quantization unit 210, 310 selecting or determining a quantization parameter as a function of a number of dimensions of the inverse transform used in the processing of the video block, and applying the quantization parameter to generate the output result of the dequantizing.

Figure 10:
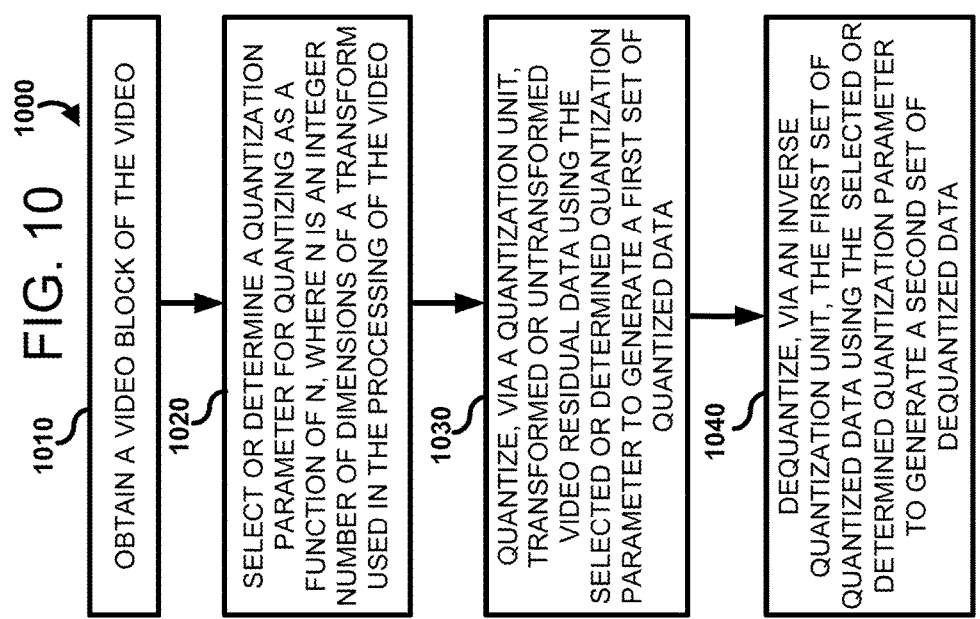
FIG. 10 is a flow chart illustrating yet another representative method for processing a video.

FIG. 10 is a flow chart illustrating yet another representative method 1000 for processing a video.

Referring to FIG. 10, the representative method 1000 may include, at block 1010, the transmit/receive unit 120 obtaining a video block of the video. At block 1020, the quantization unit 206 may select or determine a quantization parameter for quantizing as a function of N, where N is a non-negative integer number of dimensions of a transform used in the processing of the video block and, at block 1030, may quantize transformed or untransformed video residual data using the selected or determined quantization parameter to generate a first set of quantized data. For example, N may be 0, 1, and 2 . . . .

At block 1040, the inverse quantization unit 210 may dequantize the first set of quantized data using the selected or determined quantization parameter to generate a second set of dequantized data.

In certain representative embodiments, the transform unit 212 may transform the untransformed video residual data using the transform in N dimensions to generate the transformed video residual data, as sets of coefficients associated with the video block.

Figure 11:
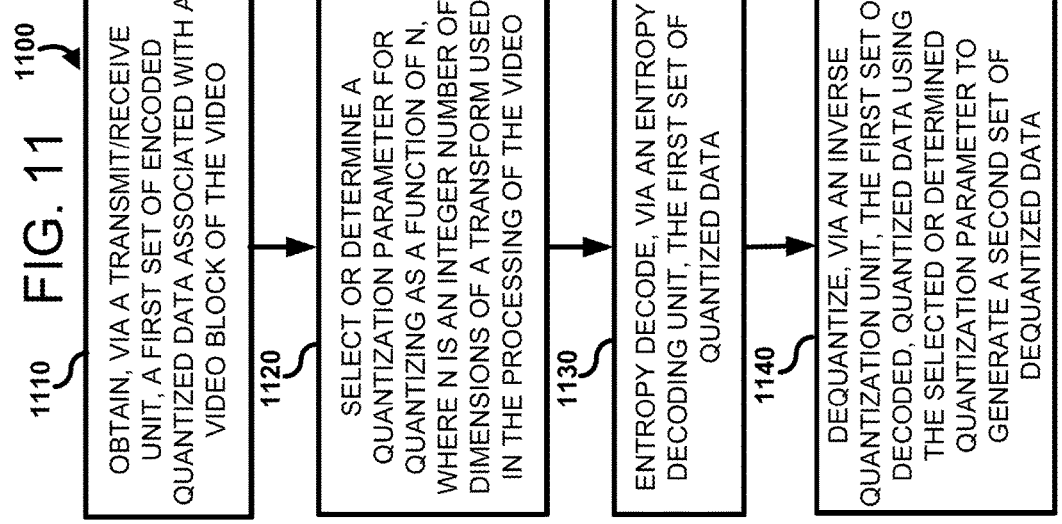
FIG. 11 is a flow chart illustrating a yet further representative method for processing a video.

FIG. 11 is a flow chart illustrating a yet further representative method 1100 for processing a video.

Referring to FIG. 11, the representative method 1100 may include, at block 1110, the transmit/receive unit 128 obtaining a first set of encoded quantized data associated with a video block of the video. At block 1120, the inverse quantization unit 310 may select or determine a quantization parameter for quantizing as a function of N, where N is a non-negative integer number of dimensions of a transform used in the processing of the video block. In certain representative embodiments, N may be 0, 1, and 2 . . . .

At block 1130, the entropy decoding unit 308 may entropy decode the first set of quantized data. At block 1140, the inverse quantization unit 310 may dequantize the first set of decoded, quantized data using the selected or determined quantization parameter to generate a second set of dequantized data.

In certain representative embodiments, the inverse transform unit 312 may detransform the second set of dequantized data using the transform in N dimensions to generate a reconstructed video block.

In certain representative embodiments, the quantization parameter may be decreased when a transform is used in less dimensions relative to being used in more dimensions (by either the inverse transform unit 212, 312 and/or the transform unit 204, for example).

Variations of the methods, apparatus and systems described above are possible without departing from the scope of the invention. In view of the wide variety of embodiments that can be applied, it should be understood that the illustrated embodiments are exemplary only, and should not be taken as limiting the scope of the following claims. For instance, in the exemplary embodiments described herein include handheld devices.

Throughout the disclosure, one of skill understands that certain representative embodiments may be used in the alternative or in combination with other representative embodiments.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of video encoding and decoding methods, apparatus and systems, it is contemplated that the they may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the described methods.

No element, act, or instruction used in the description of the present application should be construed as critical or essential to the invention unless explicitly described as such. Also, as used herein, each of the articles "a" and "an" are intended to include one or more items. Where only one item is intended, the terms "a single" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. §112, ¶6, and any claim without the word "means" is not so intended.

The following references are incorporated herein by reference:

(1) ITU-T Rec H.264 and ISO/IEC/MPEG 4 part 10, "Advanced video coding for generic audiovisual services", November 2007;
(2) SMPTE 421M, "VC-1 Compressed Video Bitstream Format and Decoding Process," April 2006;
(3) JM reference software JM16.1, http://iphome.hhi.de/suehring/tml/download/jm16.1.zip, September, 2009;
(4) B. Bross, W.-J. Han, G. J. Sullivan, J.-R. Ohm, T. Wiegand, "High Efficiency Video Coding (HEVC) text specification Working Draft 5". Document No. JCTVC-G1103. January 2011;
(5) K. McCann, B. Bross, W.-J. Han, S. Sekiguchi, G. J. Sullivan, "High Efficiency Video Coding (HEVC) Test Model 5 (HM 5) Encoder Description," Document No. JCTVC-G1102, January 2011;

(6) G. J. Sullivan and T. Wiegand, "Rate-distortion optimization for video compression," IEEE Signal Processing Magazine, vol. 15, issue 6, November 1998;

(7) M. Mrak, A. Gabriellini, D. Flynn (BBC), "Transform skip mode," Document No. JCTVC-G575, November 2011.

(8) N. S. Jayant and P. Noll, "Digital Coding of Waveforms: Principles and Applications to Speech and Video," Englewood Cliffs, N.J.: Prentice-Hall, 1984.

Representative Embodiments

In at least one representative embodiment, a method for processing video residual data associated with a video block may comprise: transforming, via a transform unit, the video residual data using a single one-dimensional transform to generate a first set of coefficients associated with the video block; quantizing, via a quantization unit, the first set of coefficients to generate a second set of quantized coefficients, wherein the method for processing the video residual data includes bit-shifting any of the first and second sets of coefficients; entropy coding the second set of quantized coefficients after the bit-shifting; and/or transmitting the entropy coded second set of quantized coefficients.

In at least one representative embodiment, the method may further comprise: dequantizing, via an inverse quantization unit, the second set of coefficients to generate a third set of dequantized coefficients; detransforming, via an inverse transform unit, the third set of dequantized coefficients using a single one-dimensional inverse transform, as a detransformed output for generating the video residual data; and/or bit-shifting any of the first, second and third sets of coefficients or the detransformed output.

In at least one representative embodiment, the single one-dimensional transform may be a forward horizontal transform or a forward vertical transform.

In at least one representative embodiment, the processing of the video residual data may be implemented in a plurality of units including at least the transform unit and the quantization unit such that bit-shifting may occur in and/or after one or more of the plurality of units.

In at least one representative embodiment, the method may further comprise maintaining an identical dynamic range of a reconstructed video block reconstructed from the transmitted, entropy coded second set of quantized coefficients relative to the video block used in the processing.

In at least one representative embodiment, the maintaining of the identical dynamic range of the reconstructed video block may include adjusting the dynamic range in or after each of the plurality of units.

In at least one representative embodiment, the processing of the video block may be realized by 16-bit integer arithmetic.

In at least one representative embodiment, the method may further comprise: adjusting or predefining a set of scale factors established in accordance with the HEVC standard to bit shift the second set of quantized coefficients by one-half bit; and/or applying the adjusted or predefined set of scale factors in or immediately after the quantization unit.

In at least one representative embodiment, the bit shifting may include half-bit shifting during the quantizing using a set of scale factors associated with the HEVC standard that are cyclically shifted.

In at least one representative embodiment, the half-bit shifting may only be applied when the transforming uses the single one-dimensional order-$2^N$ transform, where N is a odd numbered integer.

In at least one representative embodiment, the bit shifting may further include determining a number of right bit shifts (e.g., in total and/or per stage) in accordance with a transform size and a type of transform (e.g., vertical, horizontal, and/or diagonal, among others); and/or applying the determined right bit shifts.

In at least one representative embodiment, the single one-dimensional inverse transform may be a horizontal inverse transform or a vertical inverse transform.

In at least one representative embodiment, the processing of the video residual data may be implemented in a plurality of units such that bit-shifting occurs in and/or after one or more of the plurality of units.

In at least one representative embodiment, the method may further comprise: maintaining an identical dynamic range of a reconstructed video block reconstructed from the transmitted, entropy coded second set of quantized coefficients relative to the video block used in the processing by adjusting the dynamic range in and/or after each of the plurality of units.

In at least one representative embodiment, the method may further comprise: adjusting or predefining a set of inverse scale factors established in accordance with an HEVC standard to bit shift the third set of dequantized coefficients by one-half bit; and/or applying the adjusted or predefined set of inverse scale factors in the inverse quantization unit.

In at least one representative embodiment, the bit shifting may include half-bit shifting during the dequantizing using a set of inverse scale factors associated with an HEVC standard that are cyclically shifted.

In at least one representative embodiment, the method may further comprise: selectively adjusting or predefining a set of scale factors and a set of inverse scale factors established in accordance with the HEVC standard based on a transform size to bit shift the second set of quantized coefficients by one-half bit; and/or applying the selectively adjusted or predefined sets.

In at least one representative embodiment, the bit shifting may include half-bit shifting in or immediately after neither of or both of the quantization unit and the inverse quantization unit based on transform size.

In at least one representative embodiment, the bit shifting of any of: (1) the first set of coefficients may be to maximize the dynamic range thereof realized by N-bit arithmetic, where N is a positive integer value; (2) the third set of coefficients may be to maximize the dynamic range thereof realized by N-bit arithmetic, where N is a positive integer value; and/or (3) the second set of quantized coefficients may be to adjust the dynamic range thereof to that of the video residual data.

In at least one representative embodiment, the method for processing video may comprise: obtaining, via a transmit/receive unit, a first set of encoded quantized coefficients associated with a video block of the video; entropy decoding, via an entropy decoding unit, the first set of quantized coefficients; dequantizing, via an inverse quantization unit, the first set of decoded, quantized coefficients to generate a second set of dequantized coefficients; detransforming, via an inverse transform unit, the second set of dequantized coefficients using a single one-dimensional inverse transform to generate the reconstructed video block; and/or bit-shifting any of the first and second sets of coefficients.

In at least one representative embodiment, the single one-dimensional transform may be a horizontal inverse transform or a vertical inverse transform.

In at least one representative embodiment, the processing of the video may be implemented in a plurality of units including at least the inverse transform unit and the inverse quantization unit such that bit-shifting occurs in or after one or more of the plurality of units.

In at least one representative embodiment, the method may further comprise maintaining an identical dynamic range of the reconstructed video block relative to a video block prior to transforming in an encoder.

In at least one representative embodiment, the maintaining of the identical dynamic range of the reconstructed video block may include adjusting a dynamic range in or after each of the plurality of units.

In at least one representative embodiment, the processing of the video block may be realized by 16-bit integer arithmetic.

In at least one representative embodiment, the method may further comprise: adjusting or predefining a set of inverse scale factors established in accordance with the HEVC standard to bit shift the second set of dequantized coefficients by one-half bit; and/or applying the adjusted or predefined set of inverse scale factors in or immediately after the inverse quantization unit.

In at least one representative embodiment, the bit shifting may include half-bit shifting during and/or after (e.g., immediately after) the inverse quantizing using a set of inverse scale factors associated with the HEVC standard that are cyclically shifted.

In at least one representative embodiment, the half-bit shifting may only be applied when the detransforming uses the single one-dimensional order-$2^N$ inverse transform, where N is an odd numbered integer.

In at least one representative embodiment, the bit shifting may include determining a number of right bit shifts (in total and/or per stage) in accordance with a transform size and a type of transform (e.g., vertical, horizontal, and/or diagonal, among others); and/or applying the determined right bit shifts.

In at least one representative embodiment, the method may further comprise: adjusting or predefining a set of inverse scale factors established in accordance with the HEVC standard to bit shift the second set of dequantized coefficients by one-half bit; and/or selectively applying the adjusted or predefined set based on a transform size.

In at least one representative embodiment, the bit shifting may include selectively applying fractional or half-bit shifting in and/or immediately after the inverse quantization unit based on transform size.

In at least one representative embodiment, an encoder may be configured for processing video residual data associated with a video block and may comprise: a transform unit configured to transform the video residual data using a single one-dimensional transform to generate a first set of coefficients associated with the video block; a quantization unit configured to quantize the first set of coefficients to generate a second set of quantized coefficients, any of the first and second sets of coefficients being bit-shifted; an entropy coding unit configured to entropy code the second set of quantized coefficients after being bit-shifted; and/or a transmit/receive unit configured to transmit the entropy coded second set of quantized coefficients.

In at least one representative embodiment, the encoder may further comprise: an inverse quantization unit configured to dequantize the second set of coefficients to generate a third set of dequantized coefficients; and/or an inverse transform unit configured to detransform the third set of dequantized coefficients using a single one-dimensional inverse transform, as a detransformed output for generating the video residual data wherein any of the first, second and third sets of coefficients or the detransformed output may be bit-shifted.

In at least one representative embodiment, the single one-dimensional transform may be a horizontal transform or a vertical transform.

In at least one representative embodiment, the encoder may include a plurality of units including at least the transform unit and the quantization unit such that one or more outputs of one or more respective units of the plurality of units may be bit shifted.

In at least one representative embodiment, the encoder may be configured to maintain an identical dynamic range of a reconstructed video block reconstructed based on the entropy coded second set of quantized coefficients relative to the video block used in the processing.

In at least one representative embodiment, the encoder may provide for processing of the video block by 16-bit integer arithmetic.

In at least one representative embodiment, the quantization unit may be configured to: adjust or predefine a set of scale factors established in accordance with an HEVC standard to bit shift the second set of quantized coefficients by one-half bit; and/or apply the adjusted or predefined set of scale factors.

In at least one representative embodiment, the quantization unit may be configured to half-bit shift during quantizing using a set of scale factors associated with an HEVC standard that are cyclically shifted.

In at least one representative embodiment, the quantization unit may half-bit shift only when the transforming uses a single one-dimensional order-$2^N$ transform, where N is a odd numbered integer.

In at least one representative embodiment, the encoder may be configured to determine a number of right bit shifts (e.g., in total and/or per stage) in accordance with a transform size and/or a type of transform (e.g., vertical, horizontal, and/or diagonal, among others).

In at least one representative embodiment, the inverse transform unit may apply a single one-dimensional inverse transform, which is a horizontal inverse transform or a vertical inverse transform.

In at least one representative embodiment, the inverse quantization unit may be configured to: adjust or predefine a set of inverse scale factors established in accordance with an HEVC standard to bit shift the third set of dequantized coefficients by one-half bit; and/or apply the adjusted or predefined set of inverse scale factors.

In at least one representative embodiment, the encoder may be configured to half-bit shift during dequantization using a set of inverse scale factors associated with an HEVC standard that are cyclically shifted.

In at least one representative embodiment, the bit shifting may include fractional or half-bit shifting in and/or after (e.g. immediately after) the quantization unit and in and/or after (e.g., immediately after) the inverse quantization unit based on transform size.

In at least one representative embodiment, a decoder may be configured to process video and may comprise: a transmit/receive unit configured to obtain a first set of encoded quantized coefficients associated with a video block of the video; an entropy decoder configured to entropy decode the first set of quantized coefficients; an inverse quantization unit configured to dequantize the first set of decoded, quantized coefficients to generate a second set of dequantized coefficients; and/or an inverse transform unit configured to detransform the second set of dequantized coefficients using a single one-dimensional inverse transform to generate the reconstructed video block, wherein any of the first and second sets of coefficients may be bit shifted.

In at least one representative embodiment, the inverse transform unit may apply a single one-dimensional inverse transform, which is a horizontal inverse transform or a vertical inverse transform.

In at least one representative embodiment, the decoder may include a plurality of units including at least the inverse transform unit and/or the inverse quantization unit such that one or more outputs of respective units may be bit-shifted.

In at least one representative embodiment, the decoder may be configured to maintain an identical dynamic range of a reconstructed video block relative to a video block prior to transforming in an encoder.

In at least one representative embodiment, the decoder may be configured to adjust a dynamic range of each of the outputs of the plurality of units.

In at least one representative embodiment, the decoder may be configured to provide processing by 16-bit integer arithmetic.

In at least one representative embodiment, the inverse quantization unit may be configured to: adjust or predefine a set of inverse scale factors established in accordance with the HEVC standard to bit shift the second set of dequantized coefficients by one-half bit; and/or apply the adjusted or predefined set of inverse scale factors.

In at least one representative embodiment, the inverse quantization unit may half-bit shift during or immediately after inverse quantizing using a set of inverse scale factors associated with the HEVC standard that are cyclically shifted.

In at least one representative embodiment, the decoder may be configured to selectively half-bit shift in accordance with a size of a transform.

In at least one representative embodiment, the decoder may be configured to half-bit shift only when the detransforming uses a single one-dimensional order-$2^N$ inverse transform, where N is a odd numbered integer.

In at least one representative embodiment, the decoder may be configured to determine a number of right bit shifts (e.g., in total and/or per stage) in accordance with a transform size and/or a type of transform (e.g., vertical, horizontal and/or diagonal, among others).

In at least one representative embodiment, the decoder may be configured to half-bit shift an output of the inverse quantization unit based on transform size.

In at least one representative embodiment, the decoder may be configured to: determine a number of right bit shifts (e.g., in total and/or per stage) in accordance with a transform size and a type of transform (e.g., vertical, horizontal and/or diagonal, among others) applied; and/or apply the number of determined right bit shifts.

In at least one representative embodiment, the inverse quantization unit may be configured to: adjust or predefine a set of inverse scale factors established in accordance with the HEVC standard to bit shift the second set of dequantized coefficients by one-half bit; and/or selectively apply the adjusted or predefined set of inverse scale factors.

In at least one representative embodiment, the encoder may be configured to selectively apply half-bit shifting at an output of the inverse quantization unit based on transform size.

In at least one representative embodiment, a method for processing video residual data associated with a video block in stages may comprise: quantizing, via a quantization unit, the video residual data exclusive of any transformation of the video residual data to generate a quantized video residual data, as an output result of a first one of the stages; dequantizing, via an inverse quantization unit, the video residual data to generate dequantized video residual data, as an output result of a second one of the stages; and/or after one or more of the stages, bit-shifting the output result of a respective stage.

In at least one representative embodiment, a method for processing a video in stages may comprise: obtaining a video block of the video; transforming, via a transform unit, video residual data using a single one-dimensional transform to generate a set of coefficients associated with the video block, as an output result of a first one of the stages; quantizing, via a quantization unit, the set of transformed coefficients to generate a set of quantized coefficients, as an output result of a second one of the stages; dequantizing, via an inverse quantization unit, the set of quantized coefficients to generate a set of dequantized, transformed coefficients, as an output result of a third one of the stages; detransforming, via a inverse transform unit, the set of dequantized, transformed coefficients, as an output result of a fourth one of the stages, using a single one-dimensional inverse transform for to generate the reconstructed video data; and/or after one or more of the stages, bit-shifting the outputted coefficients.

In at least one representative embodiment, the bit-shifting may include fractional bit-shifting.

In at least one representative embodiment, the quantizing may include selecting or determining a quantization parameter as a function of a number of dimensions of the transform used in the processing of the video block; and/or applying the quantization parameter to generate the output result of the quantizing.

In at least one representative embodiment, a method for processing a video may, comprise: obtaining a video block of the video; selecting or determining a quantization parameter for quantizing as a function of N, where N is an integer number of dimensions of a transform used in the processing of the video block; quantizing, via a quantization unit, transformed or untransformed video residual data using the selected or determined quantization parameter to generate a first set of quantized data; and dequantizing, via an inverse quantization unit, the first set of quantized data using the selected or determined quantization parameter to generate a second set of dequantized data.

In at least one representative embodiment, the method may further comprise transforming, via a transform unit, the untransformed video residual data using the transform in N dimensions to generate the transformed video residual data, as sets of coefficients associated with the video block.

In at least one representative embodiment, a method for processing video may comprise: obtaining, via a transmit/receive unit, a first set of encoded quantized data associated with a video block of the video; selecting or determining a quantization parameter for quantizing as a function of N, where N is an integer number of dimensions of a transform used in the processing of the video block; entropy decoding, via an entropy decoding unit, the first set of quantized data; and/or dequantizing, via an inverse quantization unit, the first set of decoded, quantized data using the selected or determined quantization parameter to generate a second set of dequantized data.

In at least one representative embodiment, the method may further comprise detransforming, via an inverse transform unit, the second set of dequantized data using the transform in N dimensions to generate a reconstructed video block.

In at least one representative embodiment, N may be 0, 1, and 2 . . . (e.g., a non-negative integer and, for example may be 0, 1 or 2).

In at least one representative embodiment, the quantization parameter may be decreased when a transform is used in less dimensions relative to being used in more dimensions.

In at least one representative embodiment, wherein the quantization parameter decreases as the number of dimensions of the transform used in the processing of the video transform decreases.

What is claimed is:

1. A method for processing video residual data associated with a video block, comprising:
   storing, in a memory, a set of scale factors to be applied based on a selected quantization step size parameter;
   transforming, via a processor, the video residual data using a single one-dimensional transform with an order-$2^N$ transform size, where N is a positive integer, to generate a first set of transform coefficients associated with the video block;
   determining, based on the selected quantization step size parameter, (1) one of the scale factors of the stored scale factors to be applied for quantization on condition that N is an even numbered, positive integer; and (2) a different one of the scale factors of the stored scale factors to be applied for quantization on condition that N is an odd numbered, positive integer;
   quantizing, via the processor, the first set of transform coefficients to generate a first group of quantized coefficients, the quantizing of the first set of transform coefficients includes applying: (1) the one of the scale factors on condition that N is the even numbered positive integer; and (2) the different one of the scale factors on condition that N is the odd numbered, positive integer;
   bit-shifting, via the processor, any of the first set and first group of coefficients;
   entropy coding the first group of quantized coefficients after the bit-shifting; and
   transmitting the entropy coded first group of quantized coefficients.

2. The method of claim 1, further comprising:
   storing, in the memory, a set of inverse scale factors to be applied based on a selected quantization step size parameter;
   determining, based on the selected quantization step size parameter: (1) one of the inverse scale factors of the stored inverse scale factors to be applied for dequantization on condition that N is the even numbered, positive integer; and (2) a different one of the inverse scale factors of the stored inverse scale factors to be applied for dequantization on condition that N is the odd numbered, positive integer;
   dequantizing, via the processor, the first group of quantized coefficients to generate a second set of dequantized transform coefficients, the dequantizing of the first group of quantized coefficients includes applying: (1) the one of the inverse scale factors on condition that N is the even numbered, positive integer; and (2) the different one of the inverse scale factors on condition that N is the odd numbered, positive integer;
   detransforming, via the processor, the second set of dequantized transform coefficients using a single one-dimensional inverse transform, as a detransformed output for generating the video residual data; and
   bit-shifting, via the processor, the second set of dequantized transform coefficients or the detransformed output by a number of bits, wherein the number of bits shifted is based on the selected quantization step size parameter.

3. The method of claim 1, wherein the single one-dimensional transform is a forward horizontal transform or a forward vertical transform.

4. The method of claim 1, wherein the processing of the video residual data is implemented in a plurality of modules including at least a transform module and a quantization module such that bit-shifting occurs in or after one or more of the plurality of modules.

5. The method of claim 4, further comprising maintaining an identical dynamic range of a reconstructed video block reconstructed from the transmitted, entropy coded first group of quantized coefficients relative to the video block used in the processing.

6. The method of claim 5, wherein the maintaining of the identical dynamic range of the reconstructed video block includes adjusting the dynamic range in or after each of the plurality of modules.

7. The method of claim 5, wherein the processing of the video block is realized by 16-bit integer arithmetic operations.

8. The method of claim 2, wherein the bit shifting of any of: (1) the first set of coefficients is to maximize the dynamic range thereof realized by K-bit arithmetic, where K is a positive integer value; (2) the second set of coefficients is to maximize the dynamic range thereof realized by the K-bit arithmetic; or (3) the first group of quantized coefficients is to adjust the dynamic range thereof to that of the video residual data.

9. A method for processing video residual data associated with a video block, comprising:
   storing, in a memory, a set of scale factors to be applied based on a quantization step size parameter selected;
   for a video residual data of a first block:
      transforming, via a processor, the video residual data of the first block using a one-dimensional transform in two directions to generate a first set of transform coefficients,
      quantizing, via the processor, the first set of transform coefficients to generate a first group of quantized transform coefficients, the quantizing of the first set of transform coefficients includes applying one of the stored scale factors chosen based on the selected quantization step size parameter, and
      bit-shifting any of the first set and first group of coefficients for entropy coding; and
   for a video residual data of a second block:
      transforming, via the processor, the video residual data of the second block using a one-dimensional transform in one direction to generate a second set of transform coefficients,
      quantizing, via the processor, the second set of transform coefficients to generate a second group of quantized transform coefficients, the quantizing of the second set of transform coefficients includes applying a different one of the stored scale factors chosen based on the selected quantization step size parameter, and
      bit-shifting any of the second set and second group of coefficients for entropy coding.

10. The method of claim 9, further comprising:
storing, in the memory, a set of inverse scale factors to be applied based on the quantization step size parameter selected;
for the first group of quantized transform coefficients:
   dequantizing, via a processor, the first group of quantized transform coefficients to generate a third set of dequantized transform coefficients, the dequantizing of the first group of quantized transform coefficients includes applying one of the stored inverse scale factors chosen based on the selected quantization step size parameter,
   detransforming, via the processor, the third set of dequantized transform coefficients using a one-dimensional inverse transform, as a first detransformed output for reconstructing the video residual data, and
   bit-shifting the third set of dequantized transform coefficients or the detransformed output by a first number of bits, wherein the first number of bits shifted is based on the selected quantization step size parameter; and
for the second group of quantized transform coefficients:
   dequantizing, via a processor, the second group of quantized transform coefficients to generate a fourth set of dequantized transform coefficients, wherein the dequantizing of the second group of quantized transform coefficients includes applying a different one of the inverse scale factors based on the selected quantization step size parameter,
   detransforming, via a processor, the fourth set of dequantized transform coefficients using a one-dimensional inverse transform, as a second detransformed output for reconstructing the video residual data, and
   bit-shifting the fourth set of dequantized transform coefficients or the detransformed output by a second number of bits, wherein the number of bits shifted is based on the selected quantization step size parameter and the second number of bits is different from the first number of bits.

11. A method for processing video residual data associated with a video block, comprising:
storing, in a memory, a set of inverse scale factors to be applied based on a quantization step size parameter selected;
obtaining a first group of quantized transform coefficients;
determining, based on the selected quantization step size parameter for a single one-dimensional transform with an order-$2^N$ transform size, (1) one of the inverse scale factors of the stored inverse scale factors to be applied for dequantization on condition that N is an even numbered, positive integer; and (2) a different one of the inverse scale factors of the stored inverse scale factors to be applied for dequantization on condition that N is an odd numbered, positive integer;

dequantizing, via a processor, the first group of transform coefficients to generate a first set of dequantized transform coefficients, the dequantizing of the first group of quantized transform coefficients includes applying: (1) the one of the stored inverse scale factors on condition that N is the even numbered, positive integer; and (2) the different one of the stored inverse scale factors on condition that N is the odd numbered, positive integer;
detransforming, via the processor, the first set of dequantized transform coefficients using a single one-dimensional inverse transform, as a detransformed output for reconstructing the video residual data; and
bit-shifting the first set of dequantized transform coefficients or the detransformed output by a number of bits, wherein the number of bits shifted is based on the selected quantization step size parameter.

12. The method of claim 1, wherein the different one of the stored scale factors is cyclically shifted relative to the one of the stored scale factors.

13. The method of claim 1, wherein the set of stored scale factors are a cyclically ordered set of scale factors such that the different one of the stored scale factors is three cyclic positions from the one of the stored scale factors in the set of stored scale factors.

14. The method of claim 9, wherein the different one of the stored scale factors is cyclically shifted relative to the one of the stored scale factors in the set of stored scale factors.

15. The method of claim 9, wherein the set of stored scale factors are a cyclically ordered set of scale factors such that the different one of the stored scale factors is three cyclic positions from the one of the stored scale factors in the set of stored scale factors.

16. The method of claim 2, wherein the different one of the stored inverse scale factors is cyclically shifted relative to the one of the stored inverse scale factors in the set of stored inverse scale factors.

17. The method of claim 2, wherein the set of stored inverse scale factors are a cyclically ordered set of inverse scale factors such that the different one of the stored inverse scale factors is three cyclic positions from the one of the stored inverse scale factors in the set of stored inverse scale factors.

18. The method of claim 10, wherein the different one of the stored inverse scale factors is cyclically shifted relative to the one of the stored inverse scale factors in the set of stored inverse scale factors.

19. The method of claim 10, wherein the set of stored inverse scale factors are a cyclically ordered set of stored inverse scale factors such that the different one of the stored inverse scale factors is three cyclic positions from the one of the stored inverse scale factors in the set of stored inverse scale factors.

* * * * *

UNITED STATES PATENT AND TRADEMARK OFFICE
CERTIFICATE OF CORRECTION

PATENT NO. : 9,749,633 B2
APPLICATION NO. : 14/372172
DATED : August 29, 2017
INVENTOR(S) : Jie Dong and Yan Ye Page 1 of 1

It is certified that error appears in the above-identified patent and that said Letters Patent is hereby corrected as shown below:

In the Claims

In Claim 2, Column 47, Lines 52-53, change "dequanitization" to --dequantization--.

Signed and Sealed this
Thirteenth Day of November, 2018

Andrei Iancu
*Director of the United States Patent and Trademark Office*